United States Patent
Kurabayashi

(10) Patent No.: US 12,059,618 B2
(45) Date of Patent: Aug. 13, 2024

(54) SYSTEM FOR ACCEPTING INSTRUCTION ON NOTIFICATION SCREEN

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 476 days.

(21) Appl. No.: 17/357,703

(22) Filed: Jun. 24, 2021

(65) Prior Publication Data

US 2021/0316219 A1  Oct. 14, 2021

Related U.S. Application Data

(63) Continuation of application No. PCT/JP2019/047170, filed on Dec. 3, 2019.

(30) Foreign Application Priority Data

Dec. 26, 2018 (JP) .................................. 2018-242982

(51) Int. Cl.
*A63F 13/5375* (2014.01)

(52) U.S. Cl.
CPC ................... *A63F 13/5375* (2014.09)

(58) Field of Classification Search
CPC ........ A63F 13/30; A63F 13/335; A63F 13/35; A63F 13/533; A63F 13/5375;
(Continued)

(56) References Cited

U.S. PATENT DOCUMENTS

| 8,764,568 B2 * | 7/2014 | Holme | H04W 4/12 463/40 |
| 8,805,939 B2 * | 8/2014 | Ye | A63F 13/87 709/206 |

(Continued)

FOREIGN PATENT DOCUMENTS

| JP | 2013208219 A | * | 10/2013 |
| JP | 2016165360 A | * | 9/2016 |

(Continued)

OTHER PUBLICATIONS

International Search Report issued in PCT/JP2019/047170 on Feb. 18, 2020 (3 pages).

(Continued)

*Primary Examiner* — Milap Shah
(74) *Attorney, Agent, or Firm* — Osha Bergman Watanabe & Burton LLP

(57) ABSTRACT

With existing game apps, in the case where the stamina is recovered through time-based recovery to an upper limit value thereof while a user is not playing the game, a message or the like indicating full stamina recovery is displayed on a notification screen of a smartphone.
According to the present invention, a terminal device, such as a smartphone, is configured so that a user can receive, from a game app, a push notification indicating full stamina recovery through time-based recovery and can perform an operation for instructing time-based stamina recovery beyond a stamina upper limit value on a screen of the push notification. This makes it possible to execute a game play more advantageously just by performing the operation on the screen of the push notification even when the user cannot afford to spend time for starting the game app and playing the game.

22 Claims, 13 Drawing Sheets

(58) Field of Classification Search
CPC .............. A63F 13/585; A63F 2300/407; A63F 2300/533; A63F 2300/535; A63F 2300/537; A63F 2300/5533; A63F 2300/572; A63F 2300/807
See application file for complete search history.

(56) References Cited

U.S. PATENT DOCUMENTS

| | | | | |
|---|---|---|---|---|
| 10,286,322 | B1* | 5/2019 | Wakeford | A63F 13/57 |
| 10,300,379 | B1* | 5/2019 | Wakeford | A63F 13/335 |
| 2004/0254004 | A1* | 12/2004 | Kojima | A63F 13/58 463/1 |
| 2007/0265091 | A1* | 11/2007 | Aguilar, Jr | A63F 13/45 463/42 |
| 2008/0026845 | A1* | 1/2008 | Aguilar | A63F 13/12 463/42 |
| 2008/0090659 | A1* | 4/2008 | Aguilar | A63F 13/30 463/42 |
| 2012/0309540 | A1* | 12/2012 | Holme | A63F 13/79 463/42 |
| 2013/0217489 | A1* | 8/2013 | Bronstein Bendayan | A63F 13/12 463/31 |
| 2013/0288757 | A1* | 10/2013 | Guthridge | A63F 13/67 463/2 |
| 2015/0056974 | A1* | 2/2015 | Kim | H04M 1/72463 455/418 |
| 2015/0379817 | A1* | 12/2015 | Masui | A63F 13/46 463/25 |
| 2017/0340963 | A1* | 11/2017 | Bucher | A63F 13/25 |
| 2019/0030437 | A1* | 1/2019 | Subbiah | A63F 13/35 |
| 2020/0353358 | A1* | 11/2020 | Teramoto | A63F 13/44 |
| 2023/0191249 | A1* | 6/2023 | Huang | A63F 13/533 463/31 |

FOREIGN PATENT DOCUMENTS

| | | | | |
|---|---|---|---|---|
| JP | 6075489 | B1* | 2/2017 | ............ A63F 3/216 |
| JP | 6090495 | B1* | 3/2017 | ............ A61F 13/216 |
| JP | 6373520 | B1 | 8/2018 | |
| JP | 6377289 | B1* | 8/2018 | ............ A63F 13/44 |
| JP | 6377289 | B1 | 8/2018 | |

OTHER PUBLICATIONS

Kodama, H.; "Latest Guerrilla Alarm & Guerrilla Timetable for Puzzle & Dragons Strategy", EIWA MOOK Smartphone gams strategy master, EIWA K.K., Aug. 20, 2014.

The actual flow of push notifications, Save my demon world!, Web archive on Mar. 25, 2016, [Searched on Feb. 13, 2019], URL, https://web.archive.org/web/20160325175245/http://hokumaka.jags.co.jp/how/ios/push_notification/push_notification.

* cited by examiner

SYSTEM FOR ACCEPTING INSTRUCTION ON NOTIFICATION SCREEN

TECHNICAL FIELD

The present invention relates to an information processing system, a program, a method, and an information processing device for presenting an operation for a game application (hereinafter referred to as a "game app") at the source of a notification on a notification screen of a terminal device, such as a smartphone, and accepting, as a user input, an instruction for executing the operation from a user (also referred to as a "player").

BACKGROUND ART

In many free-to-play mobile games that are played on terminal devices such as smartphones, a parameter indicating a cost that is consumed in exchange for the proceeding of the game is introduced as an element that limits continuous game play. Here, the parameter indicating this cost will be referred to as "stamina". However, the name "stamina" is just an example for explanation, and the parameter indicating this cost may be referred to by names other than stamina. Stamina is adopted in games of a wide range of genres directed to terminal devices (hereinafter also referred to as "player terminals" or "terminals") such as smartphones. Stamina is utilized for a variety of functions including the control of the rate of game content consumption, the retention effect, and the selling of charged-for items.

Mobile games are generally run on a client-server system. The system is realized, for example, by n (n is an arbitrary integer greater than or equal to one) player terminals acting as clients and a server mutually carrying out communication via a network. The server manages predetermined parameters in a game. For example, parameters such as the stamina in the game and an in-game currency in the game are managed by the server.

The stamina is consumed in predetermined units in accordance with the specifics of the game play performed. In the case where there is not enough stamina needed for playing the game, a user of the game can continue the game by recovering the stamina. For example, the user can recover the stamina and continue the game by selecting whether to wait for the stamina to be recovered as time elapses or to recover the stamina by consuming an in-game currency obtained with payment. Stamina recovery to an upper limit stamina value with the elapse of real time will be referred to as "time-based recovery" herein.

In the case where the stamina has been recovered to the upper limit value through such time-based recovery, the game app can perform a push notification, for example, by using a notification mechanism (e.g., the Notification API) provided by the operating system (OS) of the smartphone, thereby displaying a message indicating full stamina recovery on the notification screen of the smartphone.

The stamina that is consumed in the game can be recovered by using an item that recovers the stamina value in predetermined units (hereinafter referred to as a "recovery item"), as well as through time-based recovery. A recovery item can be obtained, for example, by consuming an in-game currency obtained with payment.

Recently, technologies concerning the control of a stamina value are actively being developed. For example, Patent Literature 1 discloses a technology in which in the case where the stamina is recovered to the upper limit value by using a recovery item in a state where an intermediate amount of stamina less than an amount needed for the proceeding of a game is remaining, the stamina is further recovered beyond the upper limit value for the remaining amount of stamina. Furthermore, Patent Literature 2 also discloses the same kind of technology.

CITATION LIST

Patent Literature

Patent Literature 1: Publication of Japanese Patent No. 6373520
Patent Literature 2: Publication of Japanese Patent No. 6377289

SUMMARY OF INVENTION

Technical Problem

With the existing technologies, in the case where there is not enough stamina needed for proceeding with the game, the user playing the game can recover the stamina beyond the upper limit stamina value by using a recovery item; however, in the case where the stamina is recovered to the upper limit value thereof through time-based recovery while the user is not playing the game, although a message or the like indicating full stamina recovery is displayed on the notification screen of the smartphone, it is not possible to perform time-based recovery beyond the upper limit stamina value.

Furthermore, when the user is busy and cannot afford to spend time to start the game app, even when the user is notified of full stamina recovery through time-based recovery via a notification such as a message displayed on the smartphone screen, the user cannot perform any operation for the game, and thus the user can do nothing but neglect the state in which the stamina has been fully recovered, in which the user can maximally play the game.

This has resulted in the recognition that a notification of full stamina recovery through time-based recovery is not so important for a user who is busy and does cannot afford to spend much time for playing a game. In particular, for a user who has installed a plurality of game apps in his or her smartphone, notifications displayed on the smartphone screen and indicating full stamina recovery by means of push notifications from individual game apps are bothersome.

In order to avoid being bothered with such notifications, it has become a common practice for most users to turn off push notifications from game apps. This has resulted in a situation where users refuse all notifications, including not only notifications of full stamina recovery but also other notifications (e.g., notifications concerning events held in games and notifications concerning charged-for items), with the result that it is not possible to present information for encouraging users to play games by means of push notifications from game apps.

In order to solve the problem described above, the present invention provides an information processing system, etc. with which a user receives a push notification indicating full stamina recovery through time-based recovery from a game app by using a terminal device such as a smartphone, which makes it possible for the user to execute a game play more advantageously just with an operation on a screen of the push notification even when the player cannot afford to spend time to start the game app and to play the game, and which makes it possible to motivate the user to turn on the feature of receiving push notifications from the game app.

Solution to Problem

As an embodiment of information processing system according to the present invention, the system includes a server and a terminal communicatively connected to the server,
wherein the server includes:
a determination means for determining whether or not a game play is allowed to be executed, on the basis of a parameter that is consumed in exchange for the proceeding of a game;
a game proceeding means for executing the game play by consuming the parameter in the case where it is determined by the determination means that the game play is allowed to be executed;
a time-based recovery means for recovering the parameter to a time-based-recovery upper limit value as the time elapses;
a server-side reception means for receiving, from the terminal, a super recovery instruction for recovering the parameter beyond the time-based-recovery upper limit value; and
a super recovery means for recovering the parameter through time-based recovery beyond the time-based-recovery upper limit value on the basis of the super recovery instruction from the terminal, and
wherein the terminal includes:
a reservation means for reserving a time for performing a push notification at a predetermined timing;
a notification display means for displaying the push notification on a notification screen when the reserved time arrives; and
an instruction accepting means for accepting, from a user via the notification screen, the super recovery instruction for recovering the parameter beyond the time-based-recovery upper limit value of the parameter.

As a second embodiment of an information processing system according to the present invention, the system includes a server and a terminal communicatively connected to the server,
wherein the server includes:
a determination means for determining whether or not a game play is allowed to be executed, on the basis of a parameter that is consumed in exchange for the proceeding of a game;
a game proceeding means for executing the game play by consuming the parameter in the case where it is determined by the determination means that the game play is allowed to be executed;
a time-based recovery means for recovering the parameter to a time-based-recovery upper limit value as the time elapses;
a push-notification instruction means for sending a push notification instruction to the terminal at a predetermined timing at which the parameter has been recovered;
a server-side reception means for receiving, from the terminal, a super recovery instruction for recovering the parameter beyond the time-based-recovery upper limit value; and
a super recovery means for recovering the parameter through time-based recovery beyond the time-based-recovery upper limit value on the basis of the super recovery instruction from the terminal, and
wherein the terminal includes:
a terminal-side reception means for receiving the push notification instruction from the server;
a notification display means for displaying a push notification on a notification screen on the basis of the push notification instruction; and
an instruction accepting means for accepting, from a user via the notification screen, the super recovery instruction for recovering the parameter beyond the time-based-recovery upper limit value of the parameter.

As an embodiment of a program according to the present invention, the program is executed by a computer communicatively connected to a server, the program causing the computer to realize:
a determination-result receiving function for receiving, from the server, a determination result obtained by determining whether or not a game play is allowed to be executed, on the basis of a parameter that is consumed in exchange for the proceeding of a game;
a game proceeding function for executing the game play in the case where the determination result indicates that the game play is allowed to be executed;
a notification displaying function for causing, at the server, a push notification to be displayed on a notification screen of the information processing device when the parameter is recovered until a predetermined time or to a predetermined value as the time elapses and the parameter is recovered;
an instruction accepting function for accepting, from a user via the notification screen, a super recovery instruction for recovering the parameter beyond a time-based-recovery upper limit value of the parameter; and
an instruction sending function for sending the super recovery instruction to the server in order to recover the parameter through time-based recovery beyond the time-based-recovery upper limit value.

As an embodiment of an information processing device according to the present invention, the information processing device is communicatively connected to a server, and includes:
a determination-result receiving means for receiving, from the server, a determination result obtained by determining whether or not a game play is allowed to be executed, on the basis of a parameter that is consumed in exchange for the proceeding of a game;
a game proceeding means for executing the game play in the case where the determination result indicates that the game play is allowed to be executed;
a notification displaying means for causing, at the server, a push notification to be displayed on a notification screen when the parameter is recovered until a predetermined time or to a predetermined value as the time elapses and the parameter is recovered;
an instruction accepting means for accepting, from a user via the notification screen, a super recovery instruction for recovering the parameter beyond a time-based-recovery upper limit value of the parameter; and
an instruction sending means for sending the super recovery instruction to the server in order to recover the parameter through time-based recovery beyond the time-based-recovery upper limit value.

As an embodiment of an information processing method according to the present invention, the method is executed at an information processing device communicatively connected to a server, and includes:
a determination-result receiving step of receiving, from the server, a determination result obtained by determining whether or not a game play is allowed to be executed, on the basis of a parameter that is consumed in exchange for the proceeding of a game;

a game proceeding step of executing the game play in the case where the determination result indicates that the game play is allowed to be executed;

a notification displaying step of causing, at the server, a push notification to be displayed on a notification screen of the information processing device when the parameter is recovered until a predetermined time or to a predetermined value as the time elapses and the parameter is recovered;

an instruction accepting step of accepting, from a user via the notification screen, a super recovery instruction for recovering the parameter beyond a time-based-recovery upper limit value of the parameter; and an instruction sending step of sending the super recovery instruction to the server in order to recover the parameter through time-based recovery beyond the time-based-recovery upper limit value.

Advantageous Effects of Invention

With an information processing system, etc. according to the present invention, in the case where a parameter that is consumed in exchange for the proceeding of a game, such as stamina, is fully recovered to a time-based-recovery upper limit value, it is possible to receive a super recovery instruction from a user, the super recovery instruction allowing time-based stamina recovery beyond the time-based-recovery upper limit value, on a screen of a push notification sent to a terminal device, such as a smartphone. This makes it possible for a user to input a super recovery instruction on the notification screen of the smartphone without having to start a game app even when the user cannot afford to spend time for playing the game, which enables time-based stamina recovery beyond the time-based-recovery upper limit value until the user finds time for playing the game.

Accordingly, the notification of full stamina recovery, displayed on the smartphone screen by the information processing system, etc. according to the present invention, serves as an advantageous notification for a user who cannot afford to spend much time for playing the game in that it becomes possible to continue time-based stamina recovery in order to play the game later. That is, the notification by the information processing system, etc. according to the present invention motivates the user to positively turn on the feature of receiving push notifications from the game app.

DESCRIPTION OF EMBODIMENTS

Embodiments of the present invention will be described below with reference to the accompanying drawings. The following embodiments are examples for explaining the present invention, and it is not intended to limit the present invention only to these embodiments. Furthermore, the present invention can be modified in various forms not departing from the gist thereof. Furthermore, the same reference signs are attached to the same components throughout the drawings wherever possible, and repeated descriptions will be omitted.

Figure 1:
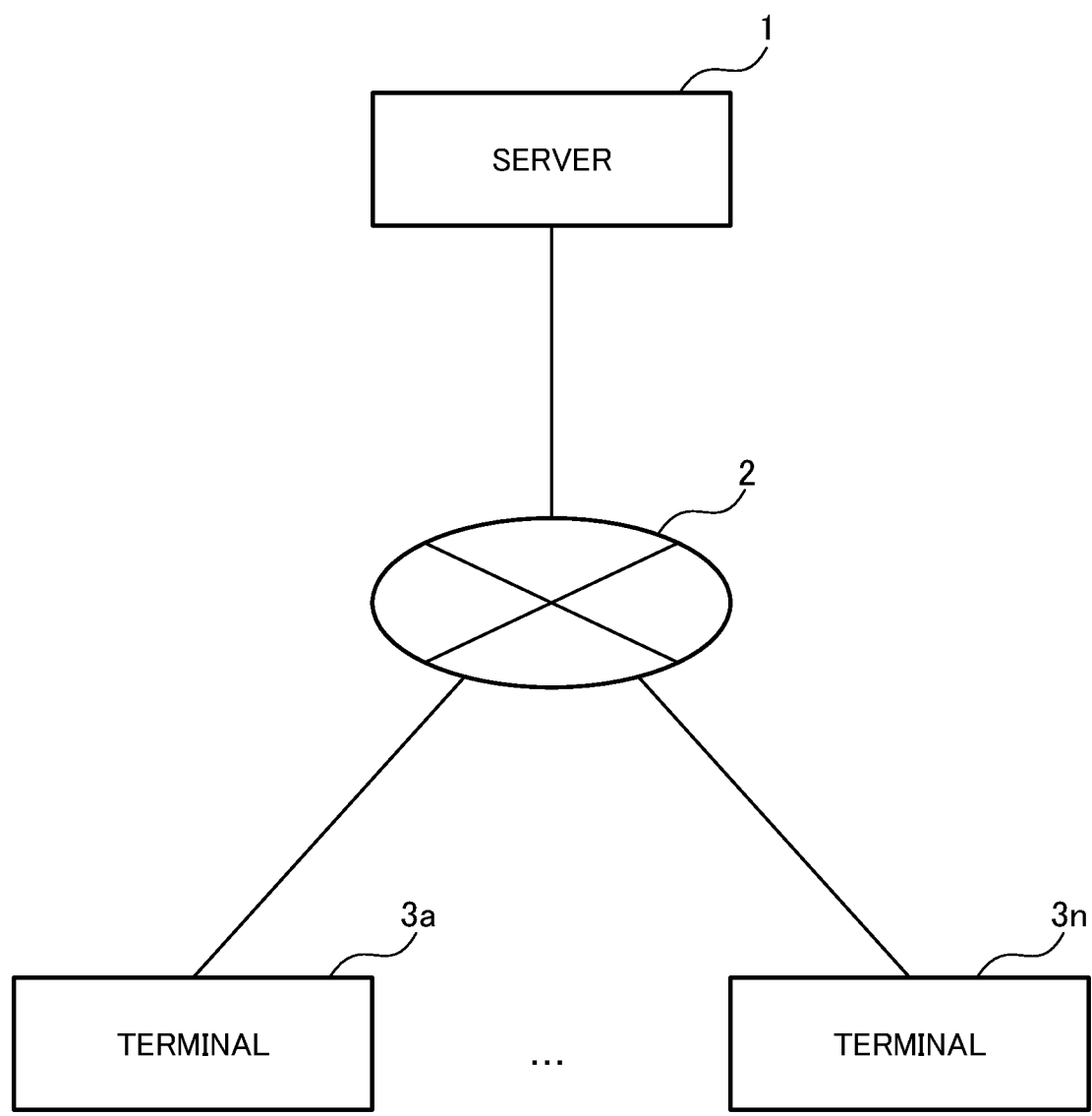
FIG. 1 is a schematic configuration diagram (system configuration diagram) of an information processing system according to a first embodiment of the present invention.

FIG. 1 is a diagram showing the configuration of an information processing system according to a first embodiment of the present invention. As an example, the information processing system 100 is configured to include a server 1, n (n is an arbitrary integer greater than or equal to 1) terminals 3 (terminal devices), and a network 2.

The information processing system 100 is what is called a client-server system. The information processing system 100 is realized by mutually carrying out communication between the n terminals 3 acting as clients and the server 1 via the network 2.

The server 1 is realized, for example, by a server device. Furthermore, the terminals 3 are realized, for example, by smartphones, game machines, or personal computers. Furthermore, the network 2 is realized, for example, by a network such as the Internet or a mobile phone network, a LAN (Local Area Network), or a network formed by combining these types of networks.

In the drawings, a terminal 3*a* and a terminal 3*n* are shown as the n terminals 3. In the following description, however, these n terminals 3 will be simply referred to as the "terminals 3", with the reference signs partially omitted, in the case where no distinction is made thereamong.

Figure 2:
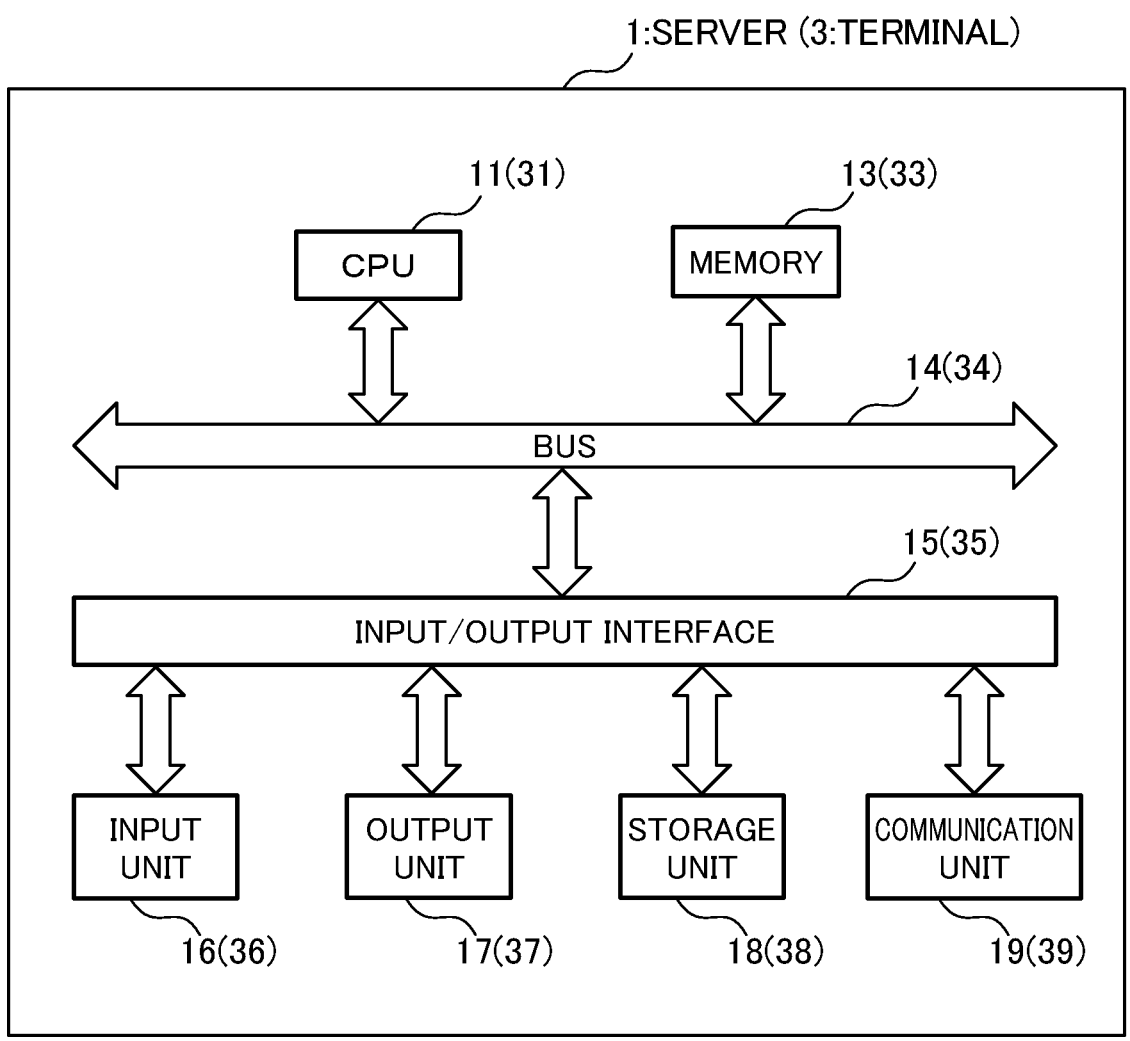
FIG. 2 is a schematic configuration diagram (block diagram) of a server and a terminal according to the first embodiment of the present invention.

FIG. 2 is a block diagram showing the hardware configurations of the server and the terminal according to the first embodiment. In the figure, reference signs corresponding to the hardware of the server 1 are shown without adding parentheses, and reference signs corresponding to the hardware of the terminal 3 are shown with added parentheses.

As an example, the server 1 includes a CPU (Central Processing Unit) 11, a memory 13 constituted of a ROM (Read Only Memory), a RAM (Random Access Memory), etc., a bus 14, an input/output interface 15, an input unit 16, an output unit 17, a storage unit 18, and a communication unit 19.

The CPU 11 executes various kinds of processing according to programs recorded in the memory 13 or programs loaded from the storage unit 18 into the memory 13.

The memory 13 also stores, as appropriate, data, etc. needed for the execution of various kinds of processing by the CPU 11. The CPU 11 and the memory 13 are connected to each other via the bus 14. The input/output interface 15 is also connected to the bus 14. The input unit 16, the output unit 17, the storage unit 18, and the communication unit 19 are connected to the input/output interface 15.

The input unit 16 is formed of various kinds of buttons, a touchscreen, a microphone, or the like, and accepts input of various kinds of information in accordance with instruction operations performed by the administrator of the server 1 or the like. Alternatively, the input unit 16 may be realized by an input device, such as a keyboard or a mouse, that is independent of a main unit accommodating the other units of the server 1.

The output unit 17 is formed of a display, a speaker, etc., and outputs image data and music data. The image data and music data output from the output unit 17 are output from the display, the speaker, etc. in forms recognizable by a player, as an image and music.

The storage unit 18 is formed of a semiconductor memory, such as a DRAM (Dynamic Random Access Memory), and stores various kinds of data.

The communication unit 19 realizes communication that is carried out with other devices. For example, the communication unit 19 carries out communication mutually with the terminals 3 via the network 2.

Furthermore, although not shown, a drive is provided, as needed and as appropriate, in the server 1. For example, a removable medium formed of a magnetic disk, an optical disk, a magneto-optical disk, a semiconductor memory, or the like is loaded, as appropriate, in the drive. The removable medium stores a program for executing a game and various kinds of data, such as image data. The program and the various kinds of data, such as image data, read by the drive from the removable medium, are installed in the storage unit 18, as needed.

Next, the hardware configuration of the terminal 3 will be described. As shown in FIG. 2, as an example, the player terminal 3 includes a CPU 31, a memory 33, a bus 34, an input/output interface 35, an input unit 36, an output unit 37, a storage unit 38, and a communication unit 39. These units individually have functions equivalent to those of the units having the same names and different reference signs in the server 1 described above. Thus, repeated descriptions will be omitted. In the case where the terminal 3 is configured as a portable device, the individual hardware units of the terminal 3, as well as a display and a speaker, may be realized in the form of an integrated device.

(Functional Configuration)

Figure 3:
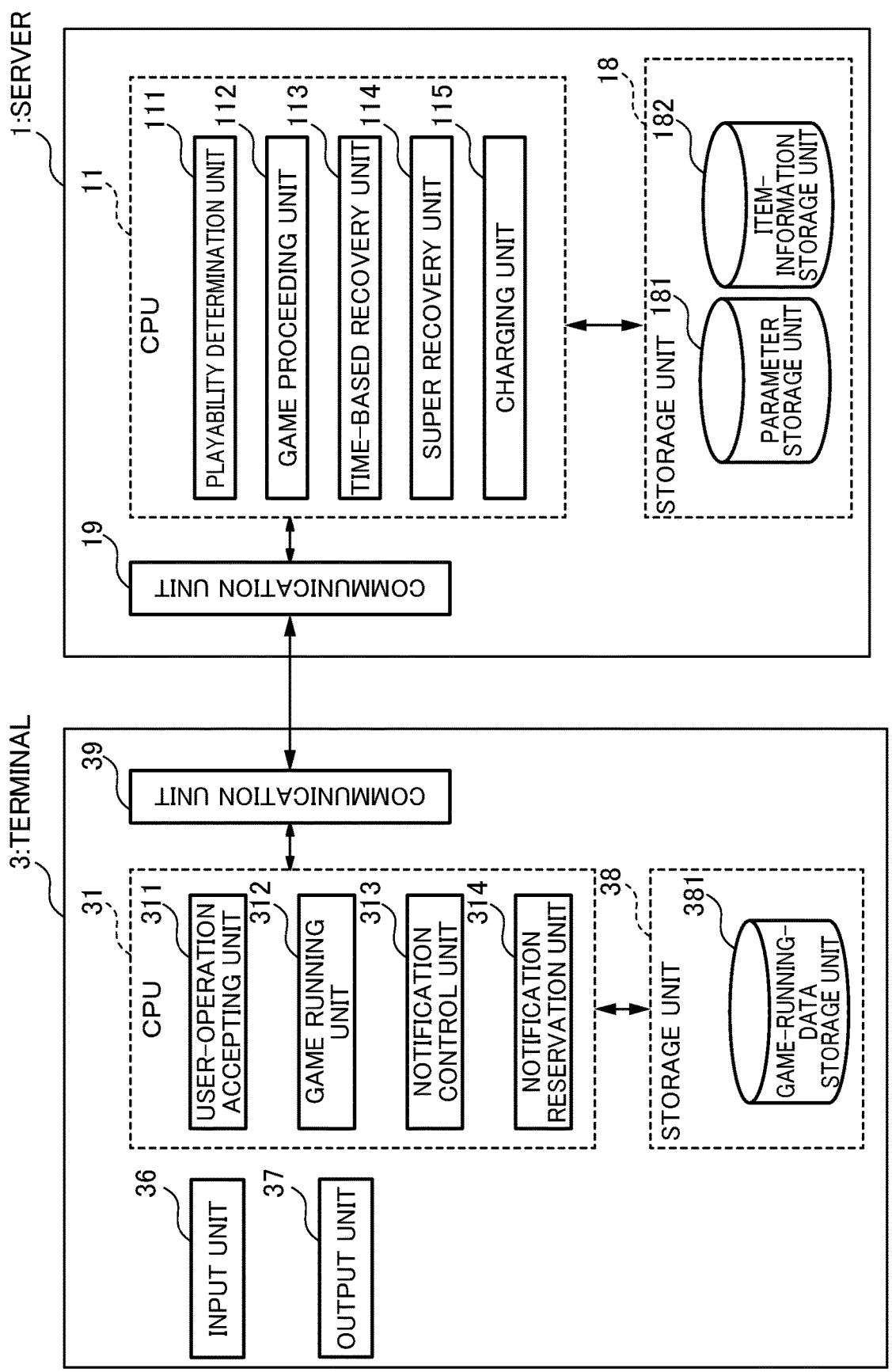
FIG. 3 is a schematic configuration diagram (block diagram) showing an example of the functional configurations of the server and the terminal according to the first embodiment of the present invention.

Next, the functional configuration of the server 1 and the functional configuration of the terminal 3 will be described with reference to FIG. 3. FIG. 3 is a schematic configuration diagram (block diagram) showing an example of the functional configurations of the server and the terminal according to the first embodiment of the present invention. FIG. 3 is a block diagram showing, in the functional configurations of the server 1 and the terminal 3 shown in FIG. 2, functional configurations for executing processing such as game-play execution processing, time-based recovery processing, and super recovery processing.

Here, the game-play execution processing refers to processing by which a game play involving stamina consumption is executed. Furthermore, the time-based recovery processing refers to processing by which stamina is recovered as time elapses. Furthermore, the super recovery processing refers to processing by which time-based stamina recovery is executed beyond an upper limit value of time-based stamina recovery in accordance with the selection of a recovery item or the like by the player and by which an in-game currency or a recovery item or the like is consumed as a price for the recovery.

At the terminal 3, in the case where the game-play execution processing, the time-based recovery processing, and the super recovery processing are executed, the CPU 31 functions as a user-operation accepting unit 311, a game running unit 312, a notification control unit 313, and a notification reservation unit 314, as shown in FIG. 3. Furthermore, a game-running-data storage unit 381 is set in a partial storage area of the storage unit 38.

The user-operation accepting unit 311 is a unit that accepts an operation concerning a game from the player. The user-operation accepting unit 311 accepts an operation concerning a game, performed by the player via the input unit 36. Then, the user-operation accepting unit 311 outputs the content of the accepted operation to the game running unit 312.

The game running unit 312 is a unit that executes processing for running the game. The game running unit 312 runs the game on the basis of game software included in the game-running-data storage unit 381 and the content of the player operation input from the user-operation accepting unit 311.

Furthermore, as the game is run, the game running unit 312 executes control processing for generating game images from image data included in the game-running-data storage unit 381 and displaying the generated images on the display connected to the output unit 37. Similarly, as the game is run, the game running unit 312 executes control processing for generating game music and audio from music data and audio data included in the game-running-data storage unit 381 and outputting the generated music and audio from the speaker connected to the output unit 37.

In the first embodiment of the present invention, predetermined parameters in the game that is run by the game running unit 312 are managed at the server 1. For example, parameters such as the stamina in the game and an in-game currency in the game are managed at the server 1. Thus, in the case where processing involving changes in these predetermined parameters (i.e., processing involving an increase or decrease in the parameter values) occurs in the game, the game running unit 312 carries out communication with the server 1 to update the parameters managed by the server 1. Then, the game running unit 212 receives the updated parameters from the server 1 and continues to run the game in accordance with the updated parameters.

For example, processing such as the game-play execution processing, the time-based recovery processing, and the super recovery processing is processing involving changes in the predetermined parameters. Thus, in the case where these kinds of processing occur, the game running unit 312 carries out communication with the server 1 to update the parameters. The specifics of these individual kinds of processing will be described later.

The game that is run by the game running unit 312 may be any game in which a game play is executed by consuming a certain cost, such as stamina, and there is no particular limitation concerning the game content, the game genre, etc. That is, this embodiment is applicable to any game.

The communication with the server 1 by the game running unit 312 is carried out by using the communication unit 39, which is a transmission/reception means on the terminal 3 side. Note that although the network 2 for realizing communication is present between the terminal 3 and the server 1, as shown in FIG. 1, the network 2 is not shown in FIG. 3.

The notification control unit 313 is a unit that executes the display of a push notification at a predetermined timing (preset timing) on a notification screen of a display or the like connected to the output unit 37. The notification control unit 313 can display a push notification on the notification screen upon the arrival of a time reserved by the notification reservation unit 314, which will be described later. Furthermore, upon receiving a push notification instruction from the server 1, the notification control unit 313 can display the push notification on the notification screen. After displaying the push notification on the notification screen of the terminal 3, the notification control unit 313 can also display, on the notification screen, a user interface that makes it possible to choose whether to activate the game app or to send a super recovery instruction to the server 1 on the basis of the content of the player instruction received on the notification screen. As described earlier, the super recovery instruction includes an instruction of a duration of time-based recovery or the amount of recovery in time-based recovery.

The notification reservation unit 314 is a unit that reserves a time for performing a push notification at a predetermined timing. The notification reservation unit 314 can calculate the time at which the stamina will be fully recovered through time-based recovery to the upper limit value of time-based stamina recovery on the basis of the amount of stamina at a predetermined timing while the game is being run, and can reserve the time for a push notification. For example, when an operation that consumes the stamina in the game is executed, the notification reservation unit 314 can calculate the time at which the stamina will be fully recovered through time-based recovery to the upper limit value of time-based stamina recovery on the basis of the amount of stamina after the consumption, and can reserve the time.

Furthermore, also when the game app is closed, the notification reservation unit 314 can calculate the time at which the stamina will be fully recovered through time-based recovery to the upper limit value of time-based stamina recovery on the basis of the amount of stamina at the time of closing, and can reserve the time for performing a push notification. The timing of the calculation of the time for full recovery and the reservation of a time for performing a push notification, performed by the notification reservation unit 314, is not limited to when an operation that consumes the stamina is executed in the game and at the time when the game app is closed, and the calculation and the reservation may be performed on the basis of the amount of stamina at a predetermined timing while the game app is being run.

Furthermore, the notification reservation unit 314 can also detect that the stamina has been fully recovered through time-based recovery to the upper limit value of time-based stamina recovery and can reserve the time for a push notification on the basis of that detection. For example, the notification reservation unit 314 can make a reservation so that a push notification will be performed within a predetermined time (e.g., "one minute") from the detection.

The game-running-data storage unit 381 is a unit that stores various kinds of data that are necessary for the game running unit 312 to run the game. The various kinds of data for running the game refer to, for example, game software constituting a program for executing the game, image data for generating game images, etc. as well as music data and audio data. Note that although the various kinds of data for running the game may be stored just in the game-running-data storage unit 381 of the storage unit 38, without limitation to this configuration, the various kinds of data for running the game may be stored in an external recording medium, such as a removable medium, and may be read, as appropriate, by a reading device, such as a drive.

At the server 1, in the case where the game-play execution processing, the time-based recovery processing, and the super recovery processing are executed, the CPU 11 functions as a playability determination unit 111, a game proceeding unit 112, a time-based recovery unit 113, a super recovery unit 114, and a charging unit 115, as shown in FIG. 3. Furthermore, a parameter storage unit 181 and an item-information storage unit 182 are set in partial areas of the storage unit 18.

The playability determination unit 111 is a unit that determines whether or not it is possible to execute a game play on the basis of the stamina that is consumed in exchange for the proceeding of the game. The playability determination unit 111 receives a game play request from the terminal 3 via the communication unit 19, which is a transmission/reception means on the server 1 side, and determines whether or not it is possible to execute the game play according to the request on the basis of whether or not there is an amount of stamina needed for the game play.

The game proceeding unit 112 is a unit that mainly executes the game-play execution processing. Upon receiving an execution request for a game play involving stamina consumption from the game running unit 312 of the terminal 3, the game proceeding unit 112 refers to the stamina value, which is one of the parameters stored in the parameter storage unit 181.

In the case where there is an amount of stamina needed for executing the game play, the game proceeding unit 112 updates the stamina value stored in the parameter storage unit 181 by decreasing the stamina value by the amount needed for executing the game play. In addition, the game proceeding unit 112 sends an instruction for executing the game play and the updated stamina value, as a response to the execution request for the game play, to the game running unit 312 of the terminal 3. Upon receiving this response, the game running unit 312 updates the stamina value in the game that is being run by the game running unit 312 and executes the game play.

Meanwhile, in the case where the amount of stamina needed for executing the game play does not exist, the game proceeding unit 112 sends an instruction for prohibiting the execution of the game play and an instruction for displaying a screen for selecting a recovery item (hereinafter referred to as a "recovery-item selection screen"), as a response to the execution request for the game play, to the game running unit 312 of the terminal 3. Upon receiving this response, the game running unit 312 displays the recovery-item selection screen instead of executing the game play. This screen includes a message indicating that the stamina is insufficient for executing the game play and a user interface that allows the player to perform recovery item selection, etc.

The amount of stamina that is decreased (i.e., the amount of stamina that is consumed) for a game play is determined in accordance with the content of the game play. For example, the amount is determined in accordance with the level of difficulty or the level of importance of the game play. Furthermore, the amount of stamina that is decreased for a game play may be uniform among game plays but may vary among game plays.

For example, for a game play having a higher level of difficulty or importance than other game plays, the amount of stamina that is decreased for the game play may be greater compared with the other game plays. Meanwhile, for example, for a game play having a lower level of difficulty or importance than other game plays, the amount of stamina that is decreased for the game play may be less compared with the other game plays.

The time-based recovery unit 113 is a unit that mainly executes the time-based recovery processing. As described earlier, the time-based recovery processing refers to processing by which the stamina is recovered as time elapses. The super recovery unit 114 is a unit that mainly executes the super recovery processing. As described earlier, the super recovery processing refers to processing by which time-based stamina recovery is executed beyond an upper limit value of time-based stamina recovery in accordance with the selection of a recovery item or the like by the player and by which an in-game currency or a recovery item or the like is consumed as a price for the recovery.

Figure 6:
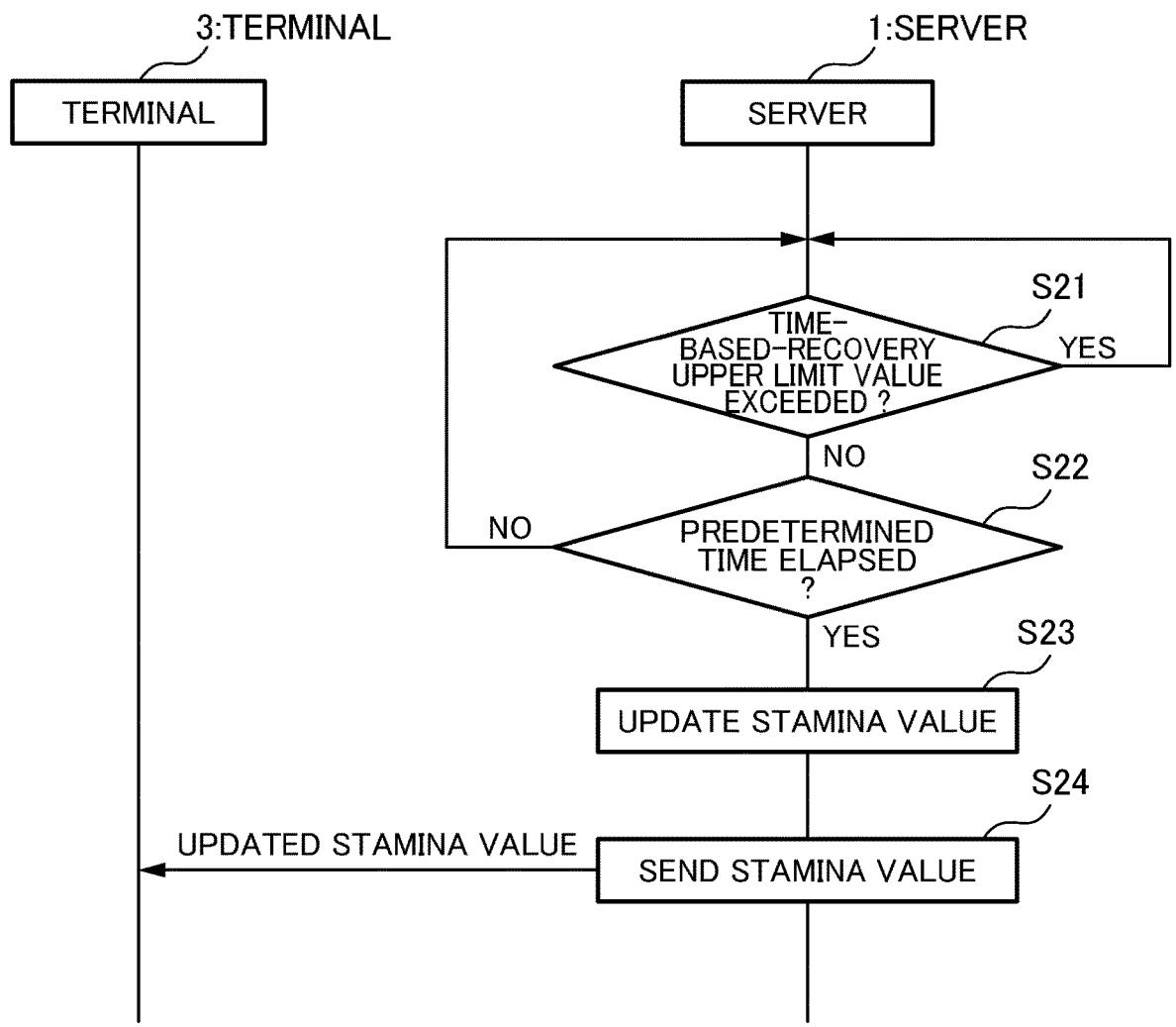
FIG. 6 is a sequence diagram explaining the flow of time-based recovery processing that is executed by the server and the terminal shown in FIG. 2 and having the functional configurations shown in FIG. 3.

The specific processing in the time-based recovery processing and the specific operation of the time-based recovery unit 113 for executing the processing will be described later with reference to FIG. 6. The specific processing in the super recovery processing and the specific operation of the super recovery unit 114 for executing the processing will be described later with reference to FIG. 7.

The charging unit 115 is a unit that executes processing for increasing the in-game currency, which is one of the parameters stored in the parameter storage unit 181, in response to the payment of a price by the player. The payment of a price by the player is realized, for example, through cash settlement by means of a credit card or settlement via electronic money.

Upon receiving an operation for purchasing the in-game currency from the player, involving the payment of a price by the player, the game running unit 312 of the terminal 3 sends the content of the operation to the charging unit 115. Upon receiving the content of the operation, the charging unit 115 executes processing for executing the payment of the price. The processing for executing the payment of the price is realized, for example, by the charging unit 115 carrying out communication with a server that executes authentication for executing credit card settlement or a server that manages electronic money.

Furthermore, in addition to the processing for executing the payment of the price, the charging unit 115 executes processing for increasing the in-game currency, stored in the parameter storage unit 181, in accordance with the amount of payment. For example, in the case of a game in which the in-game currency is managed in the form of virtual coins, the charging unit 115 executes processing for increasing the number of coins.

Although the method of increasing the in-game currency may be limited only to the method involving the payment of a price, as described above, increasing the in-game currency by other methods in addition may also be allowed. For example, it may be allowed to increase the in-game currency by using, as a trigger, communication among players in the game, the accomplishment of a predetermined event in the game, etc.

The parameter storage unit 181 is a unit that stores parameters in the game that is run by the game running unit 312 of the terminal 3. Examples of the parameters that are stored in the parameter storage unit 181 include the stamina and the in-game currency in the game that is run by the game running unit 312.

Note that the stamina value (stamina amount) is managed in the parameter storage unit 181 on the server 1 side and in the game-running-data storage unit 381 on the terminal 3 side. Similarly, the "time", which serves as a basis for time-based recovery, is also managed at both the server 1 and the terminal 3.

The item-information storage unit 182 is a unit that stores various kinds of recovery items for performing time-based stamina recovery beyond the upper limit value of time-based stamina recovery in the super recovery processing. The recovery items can be acquired, for example, by consuming the in-game currency obtained with payment. The recovery items include an item that instructs the duration of time-based recovery and an item that instructs an amount of recovery in time-based recovery in the super recovery processing.

(Time-Based Recovery Processing and Super Recovery Processing)

Figure 4:
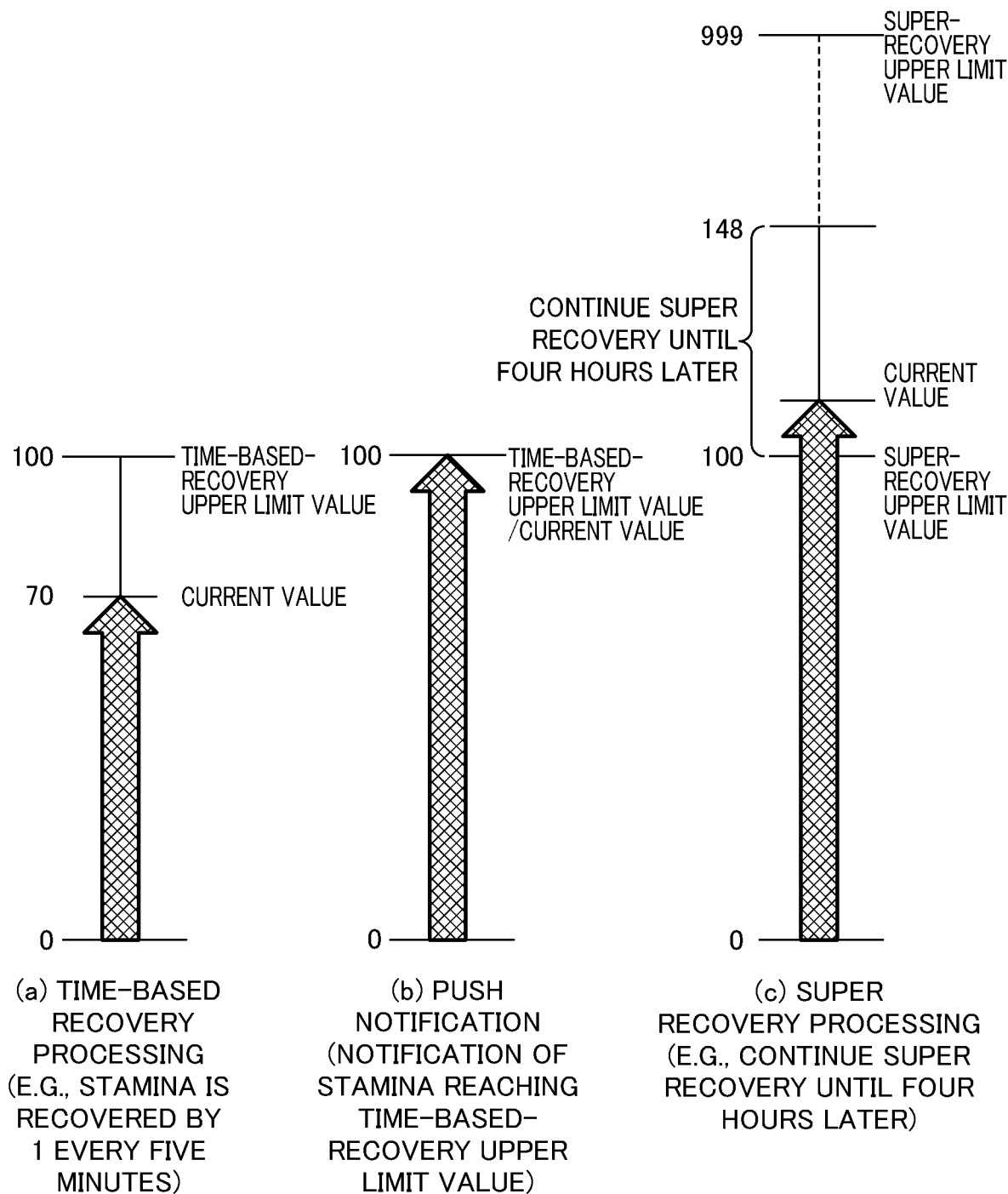
FIG. 4 is a schematic chart showing an example of time-based recovery processing and super recovery processing, in which the stamina is recovered as time elapses, according to the first embodiment of the present invention.

The time-based recovery processing and the super recovery processing will be described with reference to FIG. 3, as well as a schematic chart of the time-based recovery processing and the super recovery processing shown in FIG. 4. FIG. 4 is a schematic chart showing an example of the time-based recovery processing and the super recovery processing according to the first embodiment of the present invention, in which the stamina is recovered as time elapses. As shown in part (a) in FIG. 4, with the time-based recovery processing, it is possible to increase the stamina value by a predetermined value (e.g., "1") per predetermined time (e.g., "every five minutes"). With the time-based recovery processing, the stamina is recovered by the time-based recovery unit 113, shown in FIG. 3, by increasing the stamina value stored in the parameter storage unit 181 at a preset interval. The time-based recovery processing is executed as the time elapses, without requiring any player operation in particular.

The time-based recovery unit 113 does not execute the time-based recovery processing in the case where the stamina value is greater than the upper limit value of time-based recovery (e.g., "100"). As described above, there is a limit to the time-based recovery processing. Furthermore, the time-based recovery unit 113 sends the updated stamina value to the game running unit 312 of the terminal 3. The game running unit 312 updates the stamina value in the game that is being run by the game running unit 312 on the basis of the received updated stamina value.

As shown in part (b) in FIG. 4, in the case where the upper limit value of time-based stamina recovery is reached in the time-based recovery processing, a push notification is given at the terminal 3. The terminal 3 can display a message indicating full stamina recovery to the player by means of a push notification on the notification screen. For example, the notification screen of the terminal 3 is configured of a touchscreen, which is capable of functioning as the input unit 36 and the output unit 37.

As shown in part (c) in FIG. 4, the super recovery processing allows time-based stamina recovery beyond the upper limit value of time-based stamina recovery. For example, the super recovery processing allows time-based stamina recovery beyond the upper limit value of time-based stamina recovery in accordance with a super recovery instruction (e.g., "continue super recovery until four hours later") from the player, accepted via the notification screen of the terminal 3. In the example shown in part (c) in FIG. 4, assuming that the stamina value is recovered by 1 every five minutes, in accordance with a super recovery instruction such as "continue super recovery until four hours later", it is possible to perform time-based stamina recovery beyond the upper limit value "100" of time-based stamina recovery to a maximum of "148" (=4 hours (240 minutes)/5 minutes).

It is also possible to define a limit value for time-based recovery through super recovery. For example, in the example shown in part (c) in FIG. 4, it is possible to set "999" as the limit value of time-based recovery through super recovery (hereinafter referred to as an "upper limit value of super recovery"), which prohibits accepting a super recovery instruction exceeding the upper limit value of super recovery.

(Game-Play Execution Processing)

Figure 5:
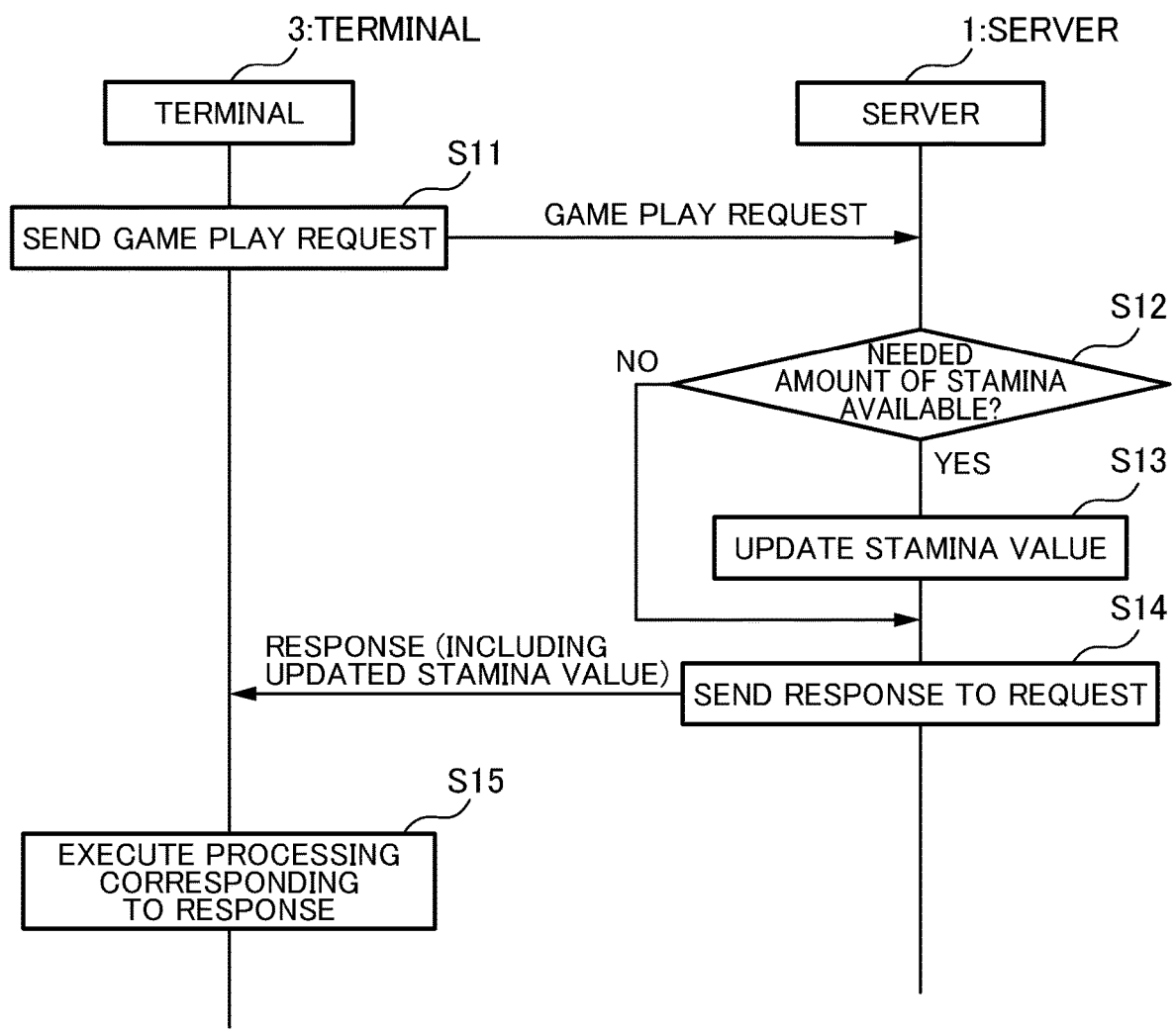
FIG. 5 is a sequence diagram explaining the flow of game-play execution processing that is executed by the server and the terminal shown in FIG. 2 and having the functional configurations shown in FIG. 3.

FIG. 5 is a sequence diagram explaining the flow of game-play execution processing that is executed by the server and the terminal shown in FIG. 2 and having the functional configurations shown in FIG. 3. The game-play execution processing is executed in the case where an operation for requesting the execution of a game play involving stamina consumption is performed by the player.

In step S11, the user-operation accepting unit 311 sends a game play request to the server 1 in accordance with an operation performed by the player to request the execution of a game play.

In step S12, the playability determination unit 111 refers to the stamina value, which is one of the parameters stored in the parameter storage unit 181, to determine whether or not there is an amount of stamina needed for the execution of the game play.

First, the case where there is an amount of stamina needed for the execution of the game play will be described. In the case where there is an amount of stamina needed for the execution of the game play, the determination in step S12 results in "Yes", and the processing proceeds to step S13. In step S13, the game proceeding unit 112 updates the stamina value by decreasing the stamina value stored in the parameter storage unit 181 by the amount needed for the execution of the game play. In this case, in step S14, the game proceeding unit 112 sends an instruction for executing the game play and the updated stamina value, as a response to the execution request for the game play, to the game running unit 312 of the terminal 3. Furthermore, in step S15, the game running unit 312 executes processing in accordance with the response. Specifically, in accordance with the response, the game running unit 312 updates the stamina value in the game that is being run by the game running unit 312 and executes the game play. Then, the game-play execution processing is finished.

Next, the case where the amount of stamina needed for the execution of the game play does not exist will be described. In the case where there the amount of stamina needed for the execution of the game play does not exist, the determination in step S112 results in "No", and the processing proceeds to step S14. In this case, in step S14, the game proceeding unit 112 sends an instruction for prohibiting the execution of the game play and an instruction for displaying the recovery-item selection screen, as a response to the execution request for the game play, to the game running unit 312 of the terminal 3. Furthermore, in step S15, the game running unit 312 executes processing in accordance with the response. Specifically, in accordance with the response, the game running unit 312 displays the recovery-item selection screen instead of executing the game play. The recovery-item selection screen includes a message indicating that the stamina is insufficient for executing the game play and a user interface that allows the player to perform recovery item selection.

(Time-Based Recovery Processing)

Next, the time-based recovery processing will be described with reference to FIG. 6. FIG. 6 is a sequence diagram explaining the flow of the time-based recovery processing that is executed by the server and the terminal shown in FIG. 2 and having the functional configurations shown in FIG. 3. The time-based recovery processing is constantly executed without requiring any player operation in particular.

In step S21, the time-based recovery unit 113 determines whether or not the stamina value exceeds the upper limit value of time-based recovery in the case where the stamina value stored in the parameter storage unit 181 is increased by a predetermined value (e.g., "1"). In the case where the upper limit value of time-based recovery is exceeded, the determination in step S21 results in "Yes", and the determination in step S21 is executed repeatedly. Meanwhile, in the case where the upper limit value of time-based recovery is not exceeded, the processing proceeds to step S22.

In step S22, the time-based recovery unit 113 determines whether or not a predetermined time (e.g., "five minutes") has elapsed since the stamina is recovered through the last time-based recovery processing or since the stamina was consumed for the execution of the last game play. In the case where the predetermined time has not elapsed, the determination in step S22 results in "No", and the processing returns to step S21 without the stamina value being increased. Meanwhile, in the case where the predetermined time has elapsed, the determination in step S22 results in "Yes", and the processing proceeds to step S23.

In step S23, the time-based recovery unit 113 updates the stamina value stored in the parameter storage unit 181 by increasing the stamina value by a predetermined value (e.g., "1"), whereby the time-based recovery processing is realized.

In step S24, the time-based recovery unit 113 sends the updated stamina value to the game running unit 312 of the terminal 3. The game running unit 312 updates the stamina value in the game that is being run by the game running unit 312 on the basis of the received updated stamina value.

Note that the time-based recovery processing is constantly executed without requiring any player operation in particular, as described earlier. However, the player may be confused if updating of the stamina value due to the time-based recovery processing occurs at a timing at which the player does not expect an increase in the stamina. Thus, the configuration may be such that, for example, while a user interface that allows the player to perform recovery item selection is being displayed, which is a timing at which the player does not expect an increase in the stamina, updating of the stamina value due to the time-based recovery processing is performed but the stamina value displayed on the user interface is not changed.

(Super Recovery Processing)

Figure 7:
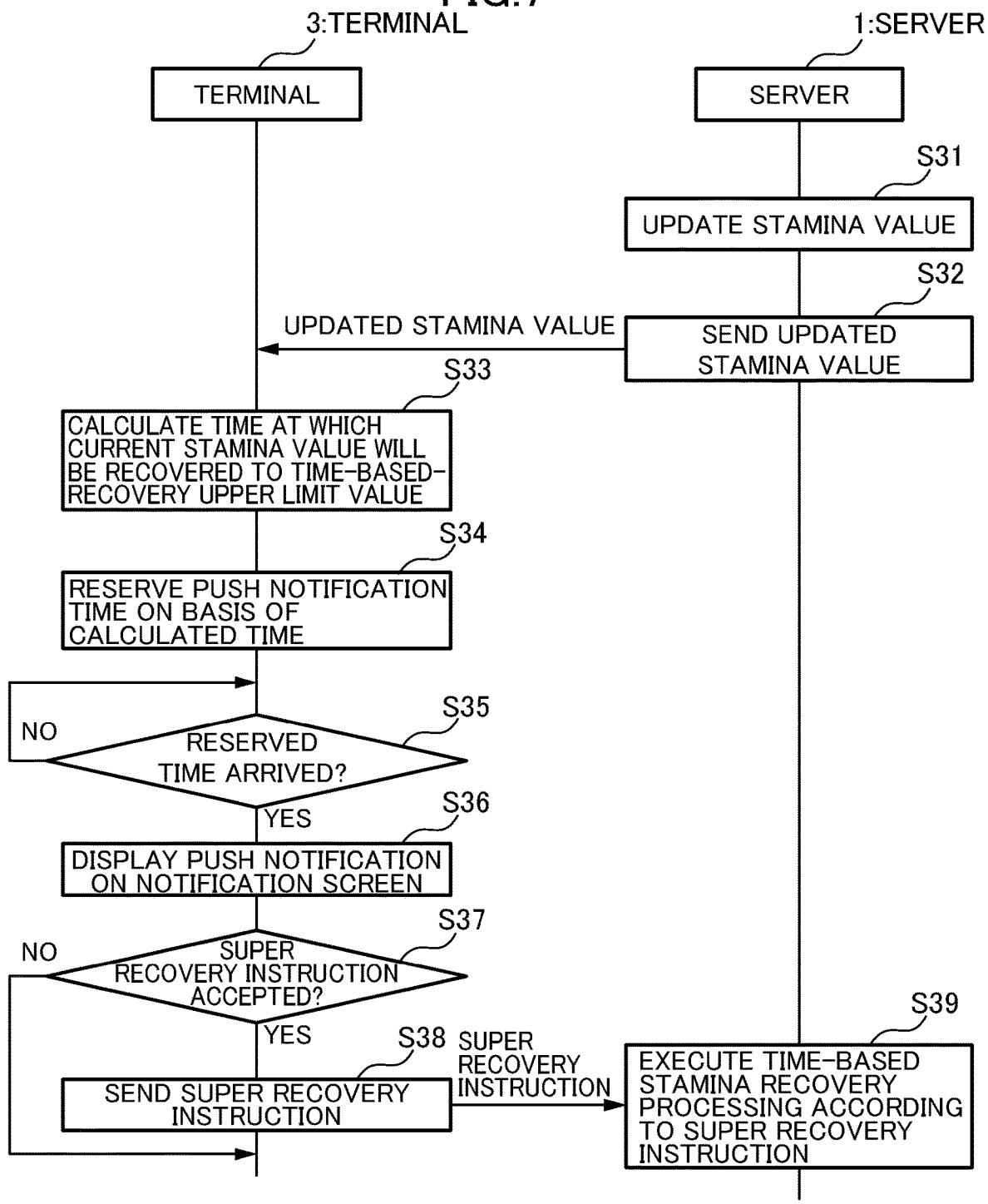
FIG. 7 is a sequence diagram explaining the flow of super recovery processing that is executed by the server and the terminal shown in FIG. 2 and having the functional configurations shown in FIG. 3.

Next, the super recovery processing will be described with reference to FIG. 7. FIG. 7 is a sequence diagram explaining the flow of the super recovery processing that is executed by the server and the terminal shown in FIG. 2 and having the functional configurations shown in FIG. 3. The time-based recovery processing is constantly executed without requiring any player operation in particular until the determination in step S35 results in "Yes".

In step S31, in association with the game-play execution processing or the time-based recovery processing, the server 1 updates the stamina value by means of the game proceeding unit 112 or the time-based recovery unit 113. In step S32, the server 1 sends the updated stamina value to the notification reservation unit 314 by means of the game proceeding unit 112 or the time-based recovery unit 113.

In step S33, the notification reservation unit 314 calculates the time at which the current stamina value will be recovered to the upper limit value of time-based recovery. For example, when an operation that consumes the stamina in the game or the like is performed, the notification reservation unit 314 calculates the time at which the stamina will be fully recovered through time-based recovery to the upper limit value of time-based recovery on the basis of the amount of stamina after the consumption. In the example of the time-based recovery processing shown in part (a) in FIG. 4, when the current stamina value is "70", assuming that the stamina is recovered by "1" every five minutes through time-based stamina recovery, the notification reservation unit 314 can calculate the time at which the stamina will be fully recovered to the upper limit value "100" of time-based recovery as 150 minutes (=(100−70)×5). In step S34, the notification reservation unit 314 reserves a time (time of day) for performing a push notification on the basis of the calculated time. In the example described above, the notification reservation unit 314 reserves a time that is 150 minutes later in order to perform a push notification 150 minutes later. In the case where a time for a push notification has already been reserved and a newly calculated time is to be reserved, the notification reservation unit 314 can discard the already reserved time and can reserve the newly calculated time. Note that the notification reservation unit 314 can maintain the already reserved time in the case where the already reserved time and the newly calculated time are the same.

In step S35, the notification control unit 313 determines whether or not the reserved time has arrived. In the case where the reserved time has not arrived, the determination in step S35 results in "No", and the determination in step S35 is executed repeatedly. Meanwhile, in the case where the reserved time has arrived, the determination in step S35 results in "Yes", and the processing proceeds to step S36. In step S36, the notification control unit 313 displays a push notification on the notification screen. An example of the notification screen is shown in FIG. 8.

Figure 8:
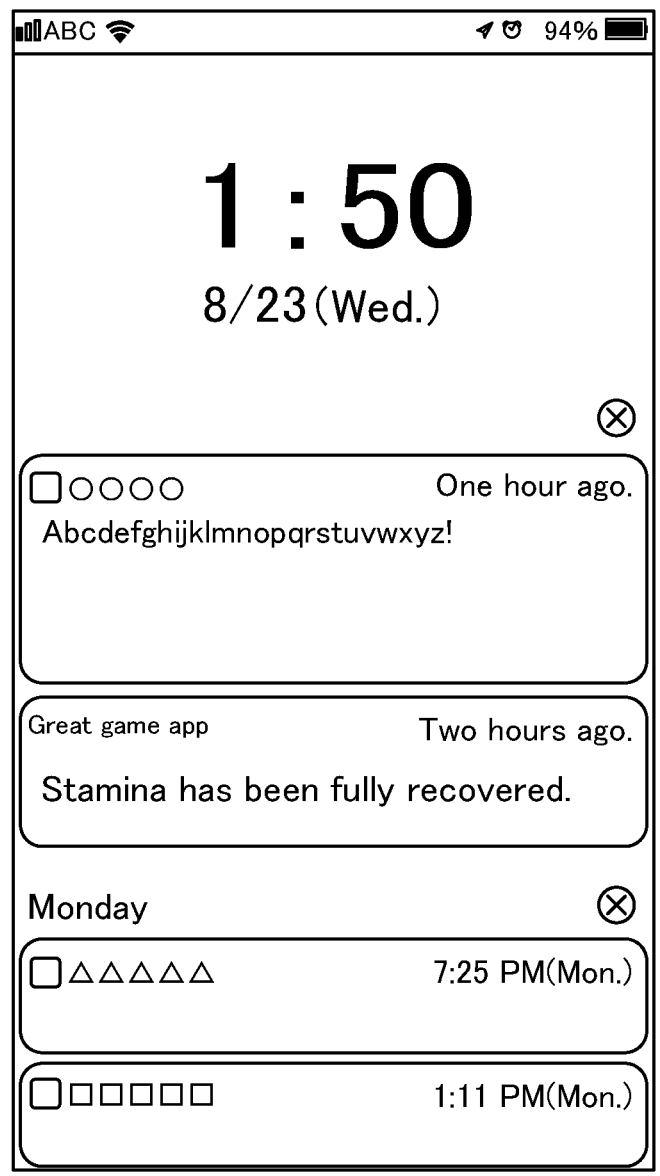
FIG. 8 is an illustration showing an example of a push notification screen according to the first embodiment of the present invention.
Figure 9:
FIG. 9 is an illustration showing an example of a screen in which a game app asks for permission for push notifications.

FIG. 8 is an illustration showing an example push notification screen according to the first embodiment of the present invention. For example, a message saying "stamina is fully recovered" is displayed on the notification screen of a terminal device, such as a smartphone, that displays the content of a push notification. Furthermore, FIG. 9 is an illustration showing an example screen in which the game app asks for permission for push notifications. The dialog shown in FIG. 9 is displayed in the case where a push notification is performed for the first time after the game app is installed in the terminal 3, which allows the player to select whether or not to permit push notifications. The player can select (tap) "OK" to permit push notifications and can select "do not permit" not to permit push notifications. Alternatively, the terminal 3 may be configured not to perform push notifications while the game app is being run.

Figure 10:
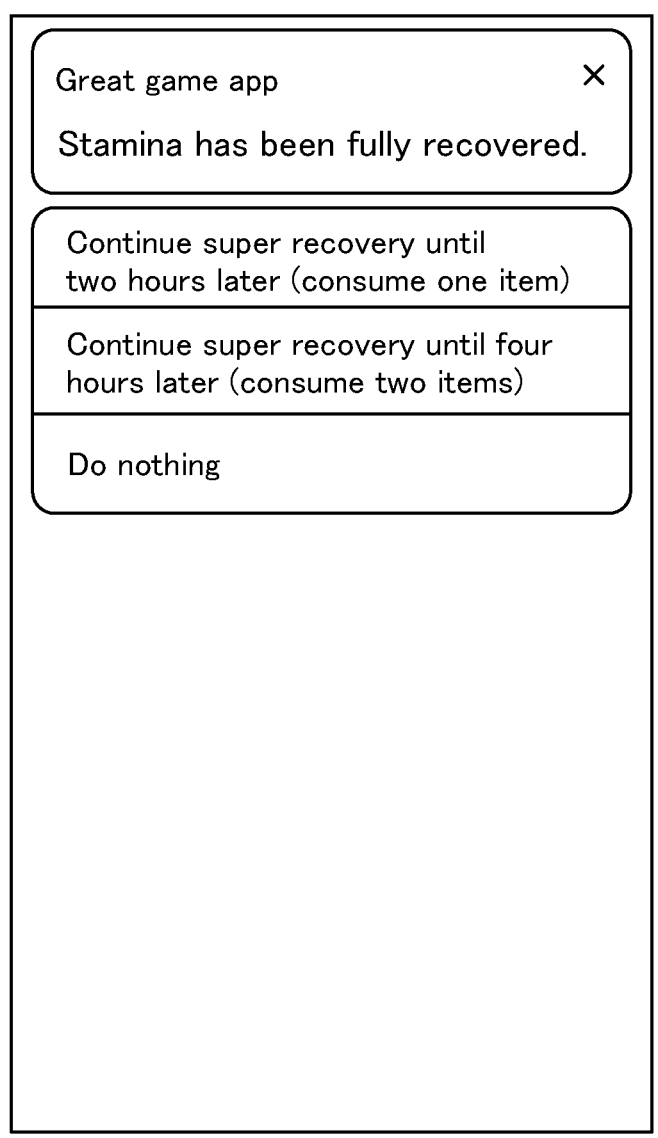
FIG. 10 is an illustration showing an example of a user interface for accepting a super recovery instruction on a push notification screen, according to the first embodiment of the present invention.

Furthermore, the notification control unit 313 can display, on the notification screen, a graphical user interface (GUI) for accepting, from the player, a super recovery instruction for time-based stamina recovery beyond the upper limit value of time-based stamina recovery. For example, when the player performs an operation on a message portion displayed in the notification screen on the notification screen shown in FIG. 8 by a method (e.g., a long tap or a swipe) dictated by an operating system (OS) installed in the terminal device, a GUI (e.g., reaction buttons) for accepting a super recovery instruction from the player is displayed, as shown in FIG. 10. That is, as described earlier, the notification control unit 313 can display, on the notification screen, a user interface for choosing whether to start the game app or to send a super recovery instruction to the server 1.

FIG. 10 is an illustration showing an example of the user interface for accepting a super recovery instruction on the push notification screen according to the first embodiment of the present invention. In the example shown in FIG. 10, reaction buttons such as "continue super recovery until two hours later (consume one item)", "continue super recovery until four hours later (consume two items)", and "do nothing" are displayed on the notification screen. The player can input an instruction such as super recovery or doing nothing on the push notification screen by selecting one of the reaction buttons. Note that the reaction buttons are not limited to those listed above, and examples thereof include a super recovery instruction that makes it possible to specify a duration of time-based recovery on the notification screen, a super recovery instruction that makes it possible to specify an amount of recovery through time-based recovery on the notification screen, and an instruction for starting the game app on the notification screen.

In step S37, the user-operation accepting unit 311 determines whether a super recovery instruction has been accepted as a user input from the player. In the case where a super recovery instruction has not been accepted, the determination in step S37 results in "No", and the super recovery processing is terminated. For example, in the example shown in FIG. 10, the user-operation accepting unit 311 can determine that a super recovery instruction has not been accepted in the case where "do nothing" is selected (tapped) by the player among the reaction buttons displayed on the notification screen. In the case where a super recovery instruction has been accepted, the determination in step S37 results in "Yes", and the processing proceeds to step S38. For example, in the example shown in FIG. 10, the user-operation accepting unit 311 can determine that a super recovery instruction has been accepted in the case where "continue super recovery until two hours later (consume one item)" or "continue super recovery until four hours later (consume two items)" is selected (tapped) by the player among the reaction buttons displayed on the notification screen.

In step S38, the user-operation accepting unit 311 sends the super recovery instruction from the player to the super recovery unit 114 of the server 1. In step S39, upon accepting the super recovery instruction, the super recovery unit 114 executes the time-based stamina recovery processing for the duration of time-based recovery, included in the super recovery instruction, or until the stamina value reaches the amount of recovery through time-based recovery, included in the super recovery instruction. The super recovery unit 114 can recover the stamina through time-based recovery beyond the upper limit value of time-based stamina recovery on the basis of the super recovery instruction from the terminal 3.

In the example of the super recovery processing shown in FIG. 7, after receiving the updated stamina value from the server 1, the notification reservation unit 314 of the terminal 3 executes processing in step S33 and step S34. That is, when an operation that consumes the stamina in the game is performed, the notification reservation unit 314 can calculate the time at which the stamina will be fully recovered through time-based recovery to the upper limit value of time-based recovery on the basis of the amount of stamina after the consumption, and can reserve the time. Furthermore, the super recovery processing is not limited to the example shown in FIG. 7. For example, when the game app is closed, the notification reservation unit 314 can also calculate the time at which the stamina will be fully recovered through time-based recovery to the upper limit value of time-based recovery on the basis of the amount of stamina at the time of closing, and can reserve the time. Furthermore, the notification reservation unit 314 can also detect that the stamina has been fully recovered through time-based recovery to the upper limit value of time-based recovery, and can reserve the time for a push notification on the basis of that detection. Furthermore, the notification reservation unit 314 can also calculate the time at which the stamina will be fully recovered through time-based recovery to the upper limit value of time-based recovery on the basis of the amount of stamina at a predetermined timing while the game is being run, and can reserve the time for a push notification.

(Functional Configuration)

Figure 11:
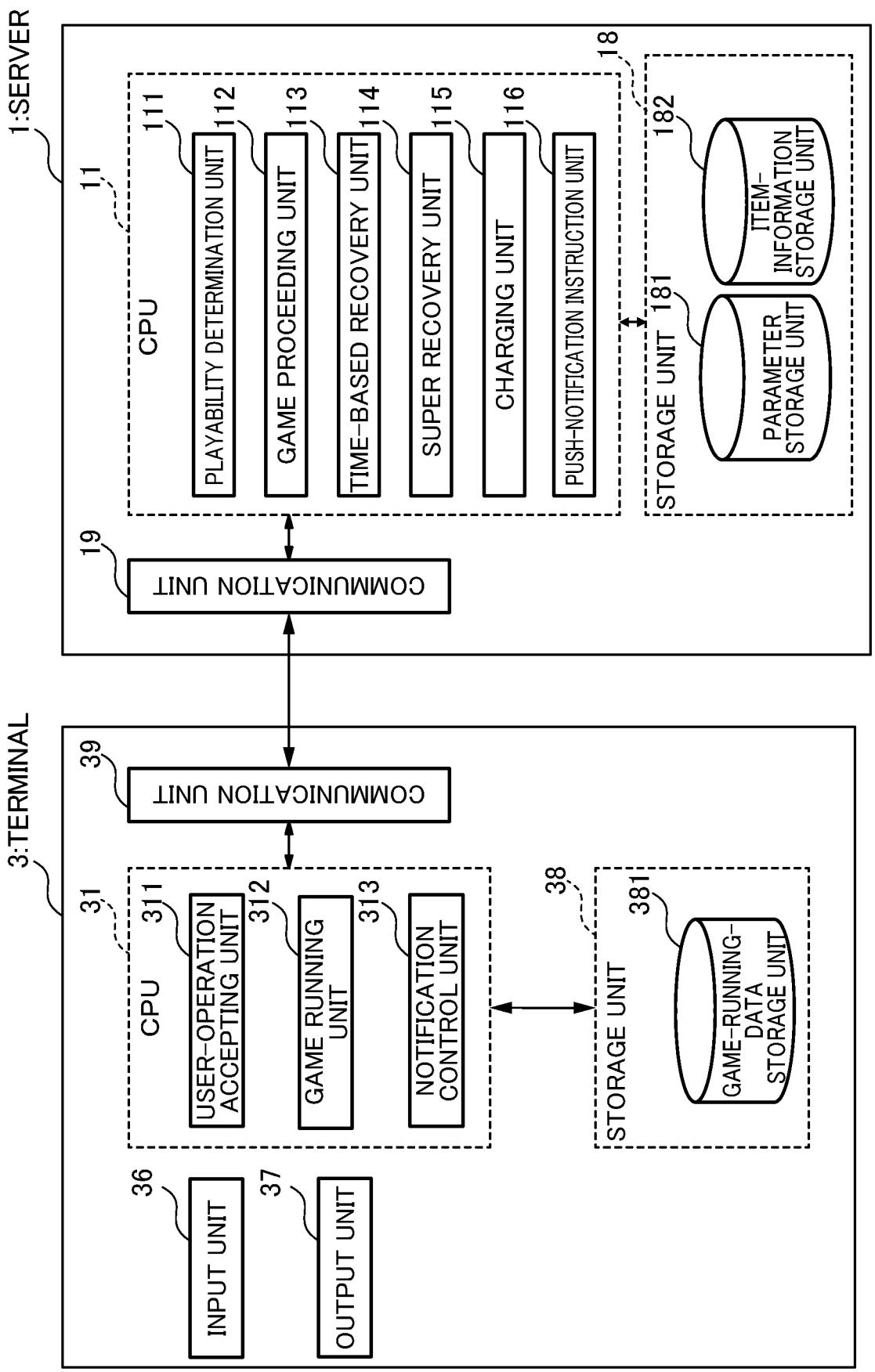
FIG. 11 is a schematic configuration diagram (block diagram) showing an example of the functional configurations of an information processing server and a terminal according to a second embodiment of the present invention.

A second embodiment of the present invention will be described with reference to FIG. 11. FIG. 11 is a schematic configuration diagram (block diagram) showing an example of the functional configurations of an information processing server and a terminal according to the second embodiment of the present invention. FIG. 11 is a block diagram showing, in the functional configurations of the server 1 and the terminal 3 shown in FIG. 2, functional configurations for executing processing such as game-play execution processing, time-based recovery processing, and super recovery processing. In the second embodiment shown in FIG. 11, parts having the same reference signs as those in the first embodiment shown in FIG. 3 have the same functional configurations, and thus descriptions thereof will be omitted. Furthermore, the functional configurations of the first embodiment and the second embodiment may be combined with each other into a single embodiment.

At the server 1, in the case where the game-play execution processing, the time-based recovery processing, and the super recovery processing are executed, the CPU 11 functions as a playability determination unit 111, a game proceeding unit 112, a time-based recovery unit 113, a super recovery unit 114, a charging unit 115, and a push-notification instruction unit 116, as shown in FIG. 11. Furthermore, a parameter storage unit 181 and an item-information storage unit 182 are set in partial areas of the storage unit 18.

The push-notification instruction unit 116 is a unit that sends a push notification instruction to the terminal 3 at a predetermined timing when the stamina is recovered. The push-notification instruction unit 116 can calculate the time at which the stamina will be fully recovered through time-based recovery to the upper limit value of time-based stamina recovery on the basis of the amount of stamina at a predetermined timing while the game is being run, and can send a push notification instruction to the terminal 3 when the time arrives. For example, when an operation that consumes the stamina in the game (game-play execution processing) is performed, the push-notification instruction unit 116 can calculate the time at which the stamina will be fully recovered through time-based recovery to the upper limit value of time-based stamina recovery on the basis of the amount of stamina after the consumption, and can send a push notification instruction to the terminal 3 when the time arrives.

Furthermore, also when the game app is closed at the terminal 3, the push-notification instruction unit 116 can calculate the time at which the stamina will be fully recovered through time-based recovery to the upper limit value of time-based stamina recovery on the basis of the amount of stamina at the time of closing, and can send a push notification instruction to the terminal 3 when the time arrives.

Furthermore, the push-notification instruction unit 116 can also detect that the stamina has been fully recovered through time-based recovery to the upper limit value of time-based stamina recovery and can send a push notification instruction to the terminal 3 on the basis of that detection.

In the second embodiment shown in FIG. 11, since the push-notification instruction unit 116 is provided on the server 1 side, it is not necessary to provide the notification reservation unit 314 on the terminal 3 side as in the first embodiment shown in FIG. 3. The notification control unit 313 of the terminal 3 can display a push notification on the notification screen upon receiving the push notification instruction sent from the push-notification instruction unit 116. An example of the notification screen is shown in FIG. 8. The details of the notification screen shown in FIG. 8 have already been described.

(Super Recovery Processing)

Figure 12:
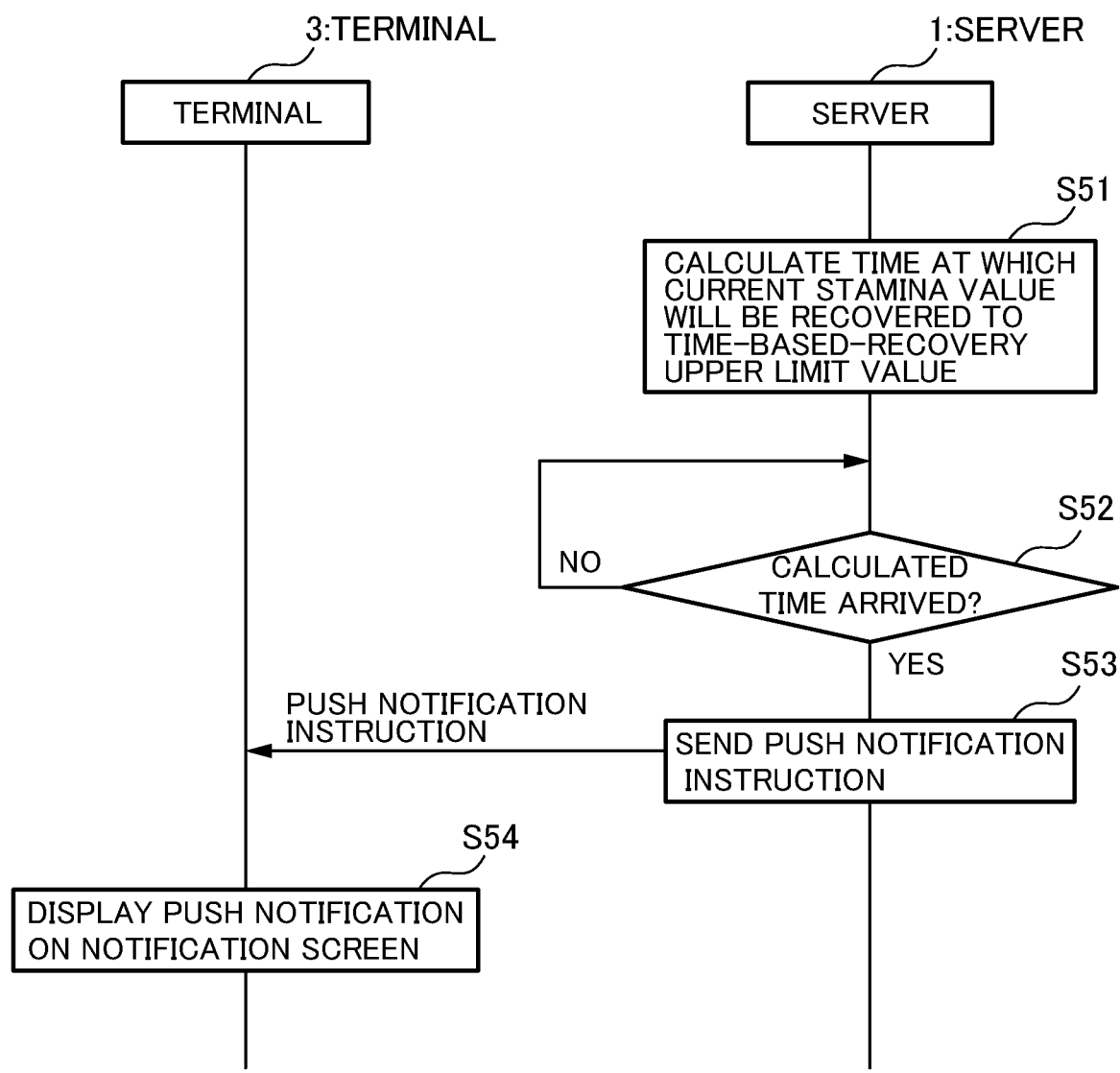
FIG. 12 shows an example of push notification processing according to the second embodiment of the present invention.

The super recovery processing in the second embodiment will be described with reference to FIG. 12. FIG. 12 shows an example of push notification processing according to the second embodiment of the present invention. In step S51, the push-notification instruction unit 116 calculates the time at which the current stamina value will be recovered to the upper limit value of time-based recovery. For example, when an operation that consumes the stamina in the game or the like is performed, the push-notification instruction unit 116 calculates the time at which the stamina will be fully recovered through time-based recovery to the upper limit value of time-based recovery on the basis of the amount of stamina after the consumption. In the example of the time-based recovery processing shown in part (a) in FIG. 4, when the current stamina value is "70", assuming that the stamina is recovered by "1" every five minutes through time-based stamina recovery, the push-notification instruction unit 116 can calculate the time at which the stamina will be fully recovered to the upper limit value "100" of time-based recovery as 150 minutes (=(100−70)×5).

In step S52, the push-notification instruction unit 116 determines whether or not the time calculated in step S51 has arrived. In the case where the time has not arrived, the determination in step S52 results in "No", and the determination in step S52 is executed repeatedly. Meanwhile, in the case where the time has arrived, the determination in step S52 results in "Yes", and the processing proceeds to step S53.

In step S53, the push-notification instruction unit 116 sends a push notification instruction to the notification control unit 313 of the terminal 3. Upon receiving the push notification instruction, the notification control unit 313 displays a push notification on the notification screen. The operation of the notification control unit 313 is the same as that in the first embodiment.

(Recursive Super Recovery Processing)

Regarding the super recovery processing in both the first embodiment shown in FIG. 3 and the second embodiment shown in FIG. 12, the super recovery processing may be applied recursively such that the super recovery processing is executed again after the elapse of a duration of time-based recovery according to a super recovery instruction (e.g., after the elapse of four hours in the case of a super recovery instruction specifying "continue super recovery until four hours later") or after an amount of recovery through time-based recovery according to a super recovery instruction (e.g., after the stamina value reaches 150 in the case of a super recovery instruction specifying "super recovery to stamina value of 150") is satisfied, whereby the notification screen (e.g., see FIGS. 8 and 10) for a push notification is displayed on the terminal 3 again to accept an instruction from the player.

In the case where the super recovery processing is applied recursively, in the first embodiment of the present invention, the notification reservation unit 314 of the terminal 3 can reserve the time (time of day) for performing a push notification on the basis of a time included in a super recovery instruction (e.g., four hours later in the case of a super recovery instruction specifying "continue super recovery until four hours later"). Furthermore, in the case of a super recovery instruction including an amount of recovery, the notification reservation unit 314 can reserve the time at which the stamina will reach the amount of recovery (e.g., in the case of a super recovery instruction specifying "super recovery to stamina value of 150", assuming that the upper limit value of time-based stamina recovery is "100", a time by which the stamina will be recovered by 50 through time-based recovery).

Furthermore, the upper limit number of times N for recursively applying the super recovery processing may be defined separately. For example, the upper limit value of the super recovery processing (hereinafter referred to as the "super-recovery upper limit value") is stored and managed in the parameter storage unit 181 of the server 1, the super recovery unit 114 can determine whether or not the number of times that the super recovery processing has been executed exceeds the super-recovery upper limit value, and the super recovery processing is executed if the number of times that the super recovery processing has been executed does not exceed the super-recovery upper limit value. In the case where the number of times that the super recovery processing has been executed exceeds the super-recovery upper limit value, the terminal 3 displays a message indicating that it is not possible to perform super recovery on the screen. Furthermore, for example, in the case where the current stamina value has reached the super-recovery upper limit value (e.g., "999") shown in part (c) in FIG. 4, the super recovery unit 114 is disabled from accepting a super recovery instruction. In this case, the terminal 3 displays a message indicating that the stamina value has reached the super-recovery upper limit value on the screen. Alternatively, the super recovery unit 114 of the server 1 may be configured not to accept a super recovery instruction with which the super-recovery upper limit value would be exceeded if the super recovery processing were executed from the current stamina value. For example, a super recovery instruction with which the super-recovery upper limit value would be exceeded is not displayed on the notification screen (see FIG. 10) of the terminal 3 so that the player cannot select the super recovery instruction.

(Auto-Play)

In the first and second embodiments of the present invention, shown in FIGS. 3 and 11, respectively, when a notification by means of a push notification is received, a notification screen such as the one shown in FIG. 8 is displayed on the terminal 3, and when a swipe or the like is performed on the message on the notification screen, a screen for accepting a super recovery instruction, such as the one shown in FIG. 10, is displayed. As a modification of the present invention, also by issuing an auto-play instruction instead of a super recovery instruction, even when the player does not have the time to activate the game app and to play the game, the player will be able to execute the game play more advantageously just by performing an operation on the push notification screen, which makes it possible to achieve the object of the present invention. This also makes it possible to motivate the player to turn on the feature of receiving push notifications from the game app.

Figure 13:
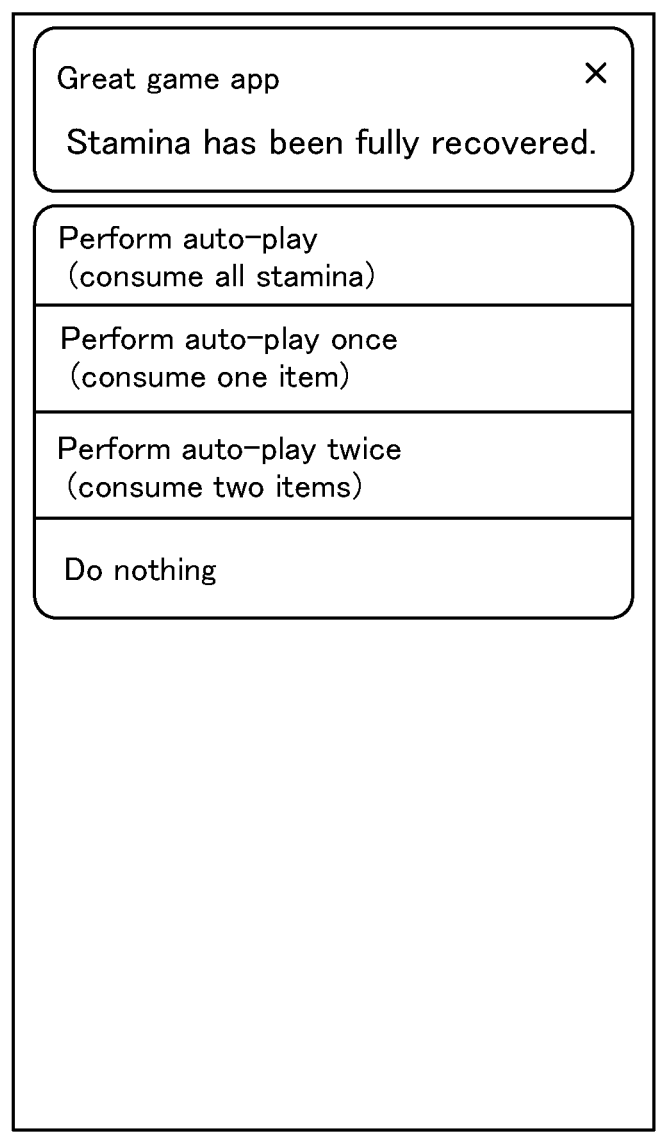
FIG. 13 is an illustration showing an example of a user interface for accepting an auto-play instruction, which can be displayed on the notification screens of the terminals according to the first and second embodiments of the present invention.

At the terminal 3 that accepts an auto-play instruction from the player, it is possible to display a screen shown in FIG. 13 instead of the screen shown in FIG. 10. FIG. 13 is an illustration showing an example of the user interface for accepting an auto-play instruction, which can be displayed on the notification screens of the terminals in the first and second embodiments of the present invention. Here, auto-play processing refers to processing in which the game-play execution processing is executed on the basis of an auto-play instruction. In the example shown in FIG. 13, reaction buttons such as "perform auto-play (consume all stamina)", "perform auto-play once (consume one item)", "perform auto-play twice (consume two items)", and "do nothing" are displayed on the notification screen. The player can input an instruction such as an auto-play or doing nothing on the push notification screen by selecting one of the reaction buttons. For example, if the player selects "perform auto-play (consume all stamina)", the game-play execution processing is repeated until the stamina needed for playing the game becomes unavailable. In the case where the stamina needed for the game is unavailable, "perform auto-play (consume all stamina)" need not be displayed on the notification screen. Note that the reaction buttons are not limited to those listed above, and examples thereof include a reaction button for specifying performing auto-play three or more times and a reaction button for instructing the start of the game app on the notification screen.

In the modification of the present invention, a game in which it is possible to perform an auto-play via a push notification is determined in advance. In one aspect, a game that can be played via a push notification may be a game that is set in advance by the game developer (hereinafter referred to as an "auto-play-enabled game". In another aspect, the player may be allowed to arbitrarily select one of a plurality of options and to set the option.

The game described above may be any game that can be executed while consuming stamina, such as a battle game, a puzzle game, a pinball game, a quiz game, a town creating game, or a character appreciating game, and there is no limitation to the kind of game.

Furthermore, difficulty levels may be set individually for a plurality of games so that a greater amount of stamina will be consumed for a game having a higher difficulty level. Alternatively, settings may be made so that the player will be awarded a better reward (a greater experience value or a greater amount of in-game currency that can be acquired, a higher rarity of an item that can be acquired, etc.) for a more difficult game.

Instead of selecting a super recovery instruction on a notification screen such as the one shown in FIG. 10, the player issues an instruction for performing auto-play in an auto-play-enabled game by selecting an auto-play instruction on a notification screen such as the one shown in FIG. 13. In the auto-play processing, the user-operation accepting unit 311 of the terminal 3 accepts an auto-play instruction, and the user-operation accepting unit 311 sends the auto-play instruction to the game proceeding unit 112 of the server 1. The game proceeding unit 112 can execute the game-play execution processing in accordance with the auto-play instruction. That is, an instruction for a game play is issued from the terminal 3 to the server 1 on the basis of an instruction from the player.

At the server 1, the auto-play-enabled game is executed on the basis of the auto-play instruction from the terminal 3. The stamina associated with the player is consumed by an amount set for the game through the auto-play processing, and the player can gain a predetermined reward.

In one aspect, at the server 1, the game-play execution processing is executed automatically without accepting an auto-play instruction from the player in the auto-play-enabled game. At the time of the execution, predetermined automatic processing is executed in the game. On the basis of a game execution result obtained through the automatic processing, the player is awarded with a predetermined reward (an experience value, an in-game currency, an item, or the like).

Furthermore, in another aspect, without executing the game-play execution processing on the basis of an auto-play at the server 1, only processing for consuming the stamina and gaining a reward may be executed. In this case, automatic game processing is not executed at the server 1. Furthermore, the content of the reward may be determined through predetermined lottery processing. With this configuration, it is possible not to execute automatic game processing at the server 1, while awarding the player with a reward corresponding to the consumed stamina, which serves to reduce the processing load on the server 1.

With the information processing system, etc. according to the present invention, by adopting the configurations of the first and second embodiments, as well as the auto-play modification, a notification indicating full stamina recovery, displayed on the screen of the terminal 3, serves as an advantageous notification for a player who cannot afford to spend much time for playing a game in that it is possible to continue time-based stamina recovery in order to play the game later or to consume the stamina fully recovered through time-based recovery by performing an auto-play and continue time-based recovery. That is, a notification by an information processing system, etc. according to the present invention makes it possible to motivate the user to positively turn on the feature of receiving push notifications from a game app.

INDUSTRIAL APPLICABILITY

An information processing system, etc. according to the present invention are applicable to, among mobile games that are run on a client-server system, games that proceed in exchange for stamina consumption.

{Reference Signs List}

| | |
|---|---|
| 1 | Server |
| 2 | Network |
| 3 | Terminal |
| 11 (31) | CPU |
| 13 (33) | Memory |
| 14 (34) | Bus |
| 15 (35) | Input/output interface |
| 16 (36) | Input unit |
| 17 (37) | Output unit |
| 18 (38) | Storage unit |
| 19 (39) | Communication unit |
| 100 | Information processing system |
| 111 | Playability determination unit |
| 112 | Game proceeding unit |
| 113 | Time-based recovery unit |
| 114 | Super recovery unit |
| 115 | Charging unit |
| 116 | Push-notification instruction unit |
| 181 | Parameter storage unit |
| 182 | Item-information storage unit |
| 311 | User-operation accepting unit |
| 312 | Game running unit |
| 313 | Notification control unit |
| 314 | Notification reservation unit |
| 381 | Game-running-data storage unit |

The invention claimed is:

1. An information processing system comprising:
a network;
a server; and
a terminal communicatively connected to the server over the network,
wherein the server comprises:
a determination means for determining whether a game play is allowed to be executed based on a parameter that is consumed in exchange for the proceeding of a computer game,
wherein the computer game is operated by the server for a plurality of terminals in mutual communication and communicatively connected over the network, and
wherein determining whether the game play for the computer game is allowed is performed in response to receiving a game play request at the server over the network from the terminal;
a game proceeding means for executing the game play by consuming the parameter in response to determining by the determination means that the game play is allowed to be executed;
a time-based recovery means for recovering the parameter to a time-based-recovery upper limit value as time elapses;
a server-side reception means for receiving, from the terminal, a super recovery instruction for recovering the parameter beyond the time-based-recovery upper limit value; and
a super recovery means for recovering the parameter through time-based recovery beyond the time-based-recovery upper limit value based on the super recovery instruction from the terminal, and
wherein the terminal comprises:
a reservation means for reserving a time for performing a push notification on a graphical user interface that is provided by the terminal and at a predetermined timing;
a notification display means for displaying the push notification on a notification screen within the graphical user interface when the reserved time arrives, wherein displaying the push notification is performed in response to a push notification instruction that is transmitted to the terminal from the server over the network; and
an instruction accepting means for accepting, from a user via the notification screen on the graphical user interface, the super recovery instruction for recovering the parameter beyond the time-based-recovery upper limit value of the parameter,
wherein accepting the super recovery instruction is performed based on a user input to a reaction button that is displayed in the graphical user interface,
wherein the super recovery instruction comprises a duration of time-based recovery, and
wherein the super recovery means recovers the parameter through time-based recovery from when the super recovery instruction is accepted to when the duration elapses.

2. The information processing system according to claim 1, wherein when an operation that consumes the parameter in the computer game is performed, the reservation means of the terminal, based on an amount of the parameter after consumption, calculates a predetermined time at which the parameter will be fully recovered through time-based recovery to the time-based-recovery upper limit value, and reserves the predetermined time.

3. The information processing system according to claim 1, wherein when a game app is closed, the reservation means of the terminal, based on an amount of the parameter at a time of closing, calculates a predetermined time at which the parameter will be fully recovered through time-based recovery to the time-based-recovery upper limit value, and reserves the predetermined time.

4. The information processing system according to claim 1, wherein the reservation means of the terminal detects that the parameter has been fully recovered through time-based recovery to the time-based-recovery upper limit value, and reserves a time for the push notification based on the detection that the parameter has been fully recovered.

5. The information processing system according to claim 1, wherein the reservation means of the terminal reserves a time for the push notification at the predetermined timing while the computer game is being run, for which the reservation means, based on an amount of the parameter at the predetermined timing, calculates a predetermined time at which the parameter will be fully recovered through time-based recovery to the time-based-recovery upper limit value, and reserves the predetermined time.

6. The information processing system according to claim 1, wherein the push notification is not performed while a game application is being run at the terminal.

7. The information processing system according to claim 1, wherein the terminal is configured to select, after the push notification is displayed on the notification screen, whether to start a game application or to send the super recovery instruction to the server based on a content of an instruction from a user, received via the notification screen.

8. The information processing system according to claim 1,
wherein the super recovery instruction includes an amount of recovery through time-based recovery, and
wherein the super recovery means executes time-based recovery of the parameter from when the super recovery instruction is accepted to when a value of the parameter reaches an amount of recovery through time-based recovery.

9. An information processing system comprising:
a server and a terminal communicatively connected to the server,
wherein the server comprises:
a determination means for determining whether a game play is allowed to be executed based on a parameter that is consumed in exchange for the proceeding of a computer game,
wherein the computer game is operated by the server for a plurality of terminals in mutual communication and communicatively connected over a network, and
wherein determining whether the game play for the computer game is allowed is performed in response to receiving a game play request at the server over the network from the terminal;
a game proceeding means for executing the game play by consuming the parameter in response to determining by the determination means that the game play is allowed to be executed;
a time-based recovery means for recovering the parameter to a time-based-recovery upper limit value as time elapses;
a push-notification instruction means for sending a push notification instruction to the terminal at a predetermined timing at which the parameter has been recovered;
a server-side reception means for receiving, from the terminal, a super recovery instruction for recovering the parameter beyond the time-based-recovery upper limit value; and
a super recovery means for recovering the parameter through time-based recovery beyond the time-based-recovery upper limit value based on the super recovery instruction from the terminal, and
wherein the terminal comprises:
a terminal-side reception means for receiving the push notification instruction from the server;
a notification display means for displaying a push notification on a notification screen within a graphical user interface on the terminal and based on the push notification instruction, wherein the push notification instruction is transmitted to the terminal from the server over the network; and
an instruction accepting means for accepting, from a user via the notification screen on the graphical user interface, the super recovery instruction for recovering the parameter beyond the time-based-recovery upper limit value of the parameter,
wherein accepting the super recovery instruction is performed based on a user input to a reaction button that is displayed in the graphical user interface,
wherein the super recovery instruction comprises a duration of time-based recovery, and
wherein the super recovery means recovers the parameter through time-based recovery from when the super recovery instruction is accepted to when the duration elapses.

10. The information processing system according to claim 9, wherein when an operation that consumes the parameter in the computer game is performed, the push-notification instruction means of the server, based on an amount of the parameter after consumption, calculates a predetermined time at which the parameter will be fully recovered through time-based recovery to the time-based-recovery upper limit value, and sends the push notification instruction to the terminal when the predetermined time arrives.

11. The information processing system according to claim 9, wherein when a game application is closed at the terminal, the push-notification instruction means of the server, based on an amount of the parameter at a time of closing, calculates a predetermined time at which the parameter will be fully recovered through time-based recovery to the time-based-recovery upper limit value, and sends the push notification instruction to the terminal when the predetermined time arrives.

12. The information processing system according to claim 9, wherein the push-notification instruction means of the server detects that the parameter has been fully recovered through time-based recovery to the time-based-recovery upper limit value, and sends the push notification instruction to the terminal based on the detection that the parameter has been fully recovered.

13. The information processing system according to claim 9, wherein the push-notification instruction means of the server, at the predetermined timing while the computer game is being run, based on amount of the parameter at the predetermined timing, calculates a predetermined time at which the parameter will be fully recovered through time-based recovery to the time-based-recovery upper limit value, and sends the push notification instruction to the terminal when the predetermined time arrives.

14. A non-transitory computer readable medium storing a program that is executed by a computer communicatively connected to a server, the program causing the computer to perform a method comprising:
receiving, from the server, a determination result obtained by determining whether a game play is allowed to be executed based on a parameter that is consumed in exchange for the proceeding of a computer game,
wherein the computer game is operated by the server for a plurality of terminals in mutual communication and communicatively connected over a network, and
wherein determining whether the game play for the computer game is allowed is performed in response to receiving a game play request at the server over the network from the computer;
executing the game play in response to the determination result indicating that the game play is allowed to be executed;
causing a push notification to be displayed on a notification screen within a graphical user interface of the computer when the parameter is recovered until a predetermined time or to a predetermined value as the parameter is recovered, wherein displaying the push notification is performed in response to a push notification instruction that is transmitted from the server to the computer over the network;
accepting, from a user via the notification screen on the graphical user interface, a super recovery instruction for recovering the parameter beyond a time-based-recovery upper limit value of the parameter; and
sending the super recovery instruction to the server in order to recover the parameter through time-based recovery beyond the time-based-recovery upper limit value,
wherein accepting the super recovery instruction is performed based on a user input to a reaction button that is displayed in the graphical user interface,
wherein the super recovery instruction comprises a duration of time-based recovery, and
wherein the parameter is recovered through time-based recovery from when the super recovery instruction is accepted to when the duration elapses.

15. The non-transitory computer readable medium storing the program according to claim 14, wherein when an operation that consumes the parameter in the computer game is performed, based on an amount of the parameter after consumption, a predetermined time is calculated at which the parameter will be fully recovered through time-based recovery to the time-based-recovery upper limit value, and the push notification is displayed on the notification screen when the predetermined time arrives.

16. The non-transitory computer readable medium storing the program according to claim 14, wherein when a game application is closed at the computer based on an amount of the parameter at a time of closing, calculates a predetermined time at which the parameter will be fully recovered through time-based recovery to the time-based-recovery upper limit value, and displays the push notification on the notification screen when the predetermined time arrives.

17. The non-transitory computer readable medium storing the program according to claim 14, wherein the parameter has been fully recovered through time-based recovery to the time-based-recovery upper limit value is detected, and the push notification on the notification screen is displayed based on the detection that the parameter has been fully recovered.

18. The non-transitory computer readable medium storing the program according to claim 14, wherein, at a predetermined timing while the game is being run, based on an amount of the parameter at the predetermined timing, a predetermined time is calculated at which the parameter will be fully recovered through time-based recovery to the time-based-recovery upper limit value, and the push notification is displayed on the notification screen when the predetermined time arrives.

19. The non-transitory computer readable medium storing the program according to claim 14, wherein the push notification is not displayed while a game application is being run at the computer.

20. The non-transitory computer readable medium storing the program according to claim 14, wherein after the push notification is displayed on the notification screen, a selection is made whether to start a game application or to send the super recovery instruction to the server based on a content of an instruction from a user, received via the notification screen.

21. An information processing device communicatively connected to a server, the information processing device comprising:
a determination-result receiving means for receiving, from the server, a determination result obtained by determining whether a game play is allowed to be executed based on a parameter that is consumed in exchange for the proceeding of a computer game,
wherein the computer game is operated by the server for a plurality of terminals in mutual communication and communicatively connected over a network, and
wherein determining whether the game play for the computer game is allowed is performed in response to receiving a game play request at the server over the network from the information processing device;
a game proceeding means for executing the game play in response to the determination result indicating that the game play is allowed to be executed;
a notification displaying means for causing a push notification to be displayed on a notification screen within a graphical user interface when the parameter is recovered until a predetermined time or to a predetermined value as the parameter is recovered, wherein displaying the push notification is performed in response to a push notification instruction that is transmitted from the server to the information processing device over the network;

an instruction accepting means for accepting, from a user via the notification screen on the graphical user interface, a super recovery instruction for recovering the parameter beyond a time-based-recovery upper limit value of the parameter; and an instruction sending means for sending the super recovery instruction to the server in order to recover the parameter through time-based recovery beyond the time-based-recovery upper limit value, wherein accepting the super recovery instruction is performed based on a user input to a reaction button that is displayed in the graphical user interface, wherein the super recovery instruction comprises a duration of time-based recovery, and wherein the parameter is recovered through time-based recovery from when the super recovery instruction is accepted to when the duration elapses.

22. An information processing method that is executed at an information processing device communicatively connected to a server, the information processing method comprising:

a determination-result receiving step of receiving, from the server, a determination result obtained by determining whether a game play is allowed to be executed based on a parameter that is consumed in exchange for the proceeding of a computer game, wherein the computer game is operated by the server for a plurality of terminals in mutual communication and communicatively connected over a network, and wherein determining whether the game play for the computer game is allowed is performed in response to receiving a game play request at the server over the network from the information processing device;

a game proceeding step of executing the game play in response to the determination result indicating that the game play is allowed to be executed;

a notification displaying step of causing a push notification to be displayed on a notification screen within a graphical user interface of the information processing device when the parameter is recovered until a predetermined time or to a predetermined value as the parameter is recovered, wherein displaying the push notification is performed in response to a push notification instruction that is transmitted from the server to the information processing device over the network;

an instruction accepting step of accepting, from a user via the notification screen on the graphical user interface, a super recovery instruction for recovering the parameter beyond a time-based-recovery upper limit value of the parameter; and an instruction sending step of sending the super recovery instruction to the server in order to recover the parameter through time-based recovery beyond the time-based-recovery upper limit value, wherein accepting the super recovery instruction is performed based on a user input to a reaction button that is displayed in the graphical user interface, wherein the super recovery instruction comprises a duration of time-based recovery, and wherein the parameter is recovered through time-based recovery from when the super recovery instruction is accepted to when the duration elapses.

* * * * *